United States Patent
Caretta et al.

(10) Patent No.: US 6,814,119 B2
(45) Date of Patent: Nov. 9, 2004

(54) SELF-SUPPORTING TIRE FOR A VEHICLE WHEEL AND METHOD FOR MANUFACTURING THE TIRE

(75) Inventors: Renato Caretta, Gallarate (IT); Pierangelo Misani, Monza (IT); Luca Frisiani, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 83 days.

(21) Appl. No.: 09/979,985

(22) PCT Filed: May 27, 2001

(86) PCT No.: PCT/EP01/03468

§ 371 (c)(1),
(2), (4) Date: Nov. 29, 2001

(87) PCT Pub. No.: WO01/72534

PCT Pub. Date: Oct. 4, 2001

(65) Prior Publication Data

US 2002/0157753 A1 Oct. 31, 2002

Related U.S. Application Data
(60) Provisional application No. 60/202,921, filed on May 9, 2000.

(30) Foreign Application Priority Data

Mar. 31, 2000 (EP) .......................................... 00830242

(51) Int. Cl.[7] .................. B60C 17/00; B60C 15/00; B60C 15/06; B29D 30/38; B29D 30/42
(52) U.S. Cl. ..................... 152/517; 152/539; 152/543; 152/548; 152/550; 152/558; 152/560; 156/133
(58) Field of Search ................................. 152/517, 558, 152/548, 539, 550, 540, 543, 560; 156/133

(56) References Cited

U.S. PATENT DOCUMENTS

| | | |
|---|---|---|
| 2,966,933 A | 1/1961 | Boussu et al. |
| 3,072,171 A | 1/1963 | Drakeford et al. |
| 3,240,250 A | 3/1966 | Frazier |
| 4,067,372 A | 1/1978 | Masson |
| 5,368,082 A | 11/1994 | Oare et al. |
| 6,026,878 A * | 2/2000 | Zhang et al. ........... 152/517 X |

FOREIGN PATENT DOCUMENTS

| | | |
|---|---|---|
| EP | 0 475 258 A1 | 3/1992 |
| EP | 0 542 252 A1 | 5/1993 |
| EP | 0 919 406 A1 | 6/1999 |
| EP | 0 928 680 A1 | 7/1999 |
| EP | 0 928 702 A1 | 7/1999 |
| EP | 0 976 535 A2 | 2/2000 |
| GB | 2 087 805 A | 6/1982 |
| WO | WO00/35666 | 6/2000 |
| WO | WO00/38906 | 7/2000 |
| WO | WO-00/73093 A1 * | 12/2000 |
| WO | WO01/36185 A1 | 5/2001 |

* cited by examiner

Primary Examiner—Adrienne C. Johnstone
(74) Attorney, Agent, or Firm—Finnegan, Henderson, Farabow, Garrett, & Dunner, L.L.P.

(57) ABSTRACT

A self-supporting tire for vehicle wheels includes a carcass structure having at least one carcass ply, a belt structure, a tread band, at least one pair of sidewalls, and at least one pair of resilient stiffening inserts incorporated into the carcass structure. The at least one carcass ply includes axially-inner strip lengths and axially-outer strip lengths, and may also include axially-intermediate strip lengths. Each of the strip lengths extend in a U-shaped configuration around a cross-section outline of the carcass structure to define two side portions spaced apart from each other in an axial direction and a crown portion extending at a radially-outer position between the side portions. The resilient stiffening inserts are axially interposed between the side portions of the axially-inner strip lengths and the side portions of the axially-outer strip lengths.

42 Claims, 10 Drawing Sheets

SELF-SUPPORTING TIRE FOR A VEHICLE WHEEL AND METHOD FOR MANUFACTURING THE TIRE

This application is a national stage entry under 35 U.S.C. § 371 from International Application No. PCT/EP01/03468, filed Mar. 27, 2001, in the European Patent Office; additionally, Applicants claim the benefit under 35 U.S.C. § 119(e) based on prior-filed, provisional application No. 60/202,921, filed May 9, 2000, in the U.S. Patent and Trademark Office; the contents of both of which are relied upon and incorporated herein by reference.

The present invention relates to a self-supporting tire for vehicle wheels, comprising: a carcass structure having at least one carcass ply provided with end flaps in engagement with respective annular anchoring structures disposed in coaxial relation with a geometric rotation axis of the tire at axially spaced apart positions with respect to each other; a belt structure applied to the carcass structure at a radially outer position thereof; a tread band applied to the belt structure at a radially outer position thereof; at least one pair of sidewalls applied to the carcass structure at opposite side positions; at least one pair of resilient stiffening inserts incorporated into the carcass structure, each at one of said sidewalls.

The present invention also relates to a method of manufacturing a self-supporting tire for vehicle wheels, comprising the steps of: preparing a carcass structure comprising at least one carcass ply having end flaps in engagement with respective annular anchoring structures disposed concentric with a geometric rotation axis of the tire at axially spaced apart positions with respect to each other; applying a belt structure to the carcass structure at a radially outer position thereof; applying a tread band to the belt structure at a radially outer position thereof; applying a pair of sidewalls to the carcass structure at opposite side positions; incorporating at least one pair of resilient stiffening inserts into the carcass structure concurrently with preparation of said at least one carcass ply.

DESCRIPTION OF THE RELATED ART

Tires for vehicle wheels essentially comprise a carcass structure consisting of one or more carcass plies that, in the most classic embodiments, have the respective inner circumferential edges turned up around inextensible annular inserts being part of annular reinforcing structures, disposed at radially opposite positions at the tire regions usually identified as "tire beads".

A belt structure is applied to the carcass ply or plies at a radially outer position thereof, which belt structure comprises one or more belt layers radially superposed upon each other. A tread band of elastomer material radially overlaps the belt structure. The outer sides of the carcass structure are also covered with respective sidewalls also made of elastomer material.

It should be also pointed out, for the purposes of the present description, that by the term "elastomer material" it is meant the rubber blend in its entirety, i.e. the assembly formed of at least one base polymer suitably amalgamated with reinforcing charges and/or process additives of different types.

In order to give the tire self-supporting qualities, i.e. the capability of ensuring short/medium runs in the absence of inflating pressure when a puncture occurs for example, the expedient of integrating into the tire, close to the sidewalls thereof, one or more reinforcing inserts of elastomer material is known, which inserts of semicircular outline and usually identified as "lunettes" conveniently support the vehicle load when the normal inflating pressure of the tire fails.

In this connection, different embodiments have been proposed aiming at giving the required self-supporting features to the tire, without impairing ride comfort too much when the tire is inflated. These solutions are essentially diversified both in the physico-chemical features of the elastomer materials employed in making the resilient stiffening inserts, and in the contemplated insert number, and also in their positioning in relation to the carcass ply or plies.

Good results, particularly in connection with the tire self-supporting capability under deflated conditions have been achieved with embodiments in which at least one of the resilient stiffening inserts which are present at each sidewall is enclosed between two carcass plies forming a sort of closed container around it, as described in documents GB 2087805, EP 475258 and EP 542252, for example.

The Applicant has however sensed that placing the resilient stiffening inserts in a sort of closed container defined by the carcass plies turned up around the annular anchoring structures tends to increase the tire sidewall rigidity too much not only with reference to its vertical flexibility, i.e. in connection with stresses substantially radial to the rotation axis of the tire, but also with reference to its torsional sensitivity, i.e. in connection with stresses directed tangentially of the circumferential extension of the tire itself.

By adopting particular expedients, as described for example in documents EP 475258 and EP 542252 in the name of the same Applicant, the possibility of restricting, within some limits, the vertical rigidity of the tire sidewall with an inflated tire under running conditions has been achieved. On the other hand, these technical solutions tend to make the tire structure more complicated and heavy and do not appear to be efficient for the purpose of controlling torsional rigidity which has been identified by the Applicant as one of the decisive factors for ride comfort above all at medium/high speeds. In fact, the tire capability of absorbing impacts transmitted by potholes or other unevennesses present on the roadway depends on the torsional rigidity of the tire itself.

The Applicant has also sensed that when the tire runs under normal inflated conditions and, all the more reason, under deflated conditions, the presence of resilient stiffening inserts completely enclosed between two carcass plies imposes strong stresses and/or deformations to the inserts themselves and also to the other constructional components of the tire that are present close to the sidewalls, which will bring about an increase in the operation temperatures and softening of the materials. Due to the above, use of materials having high moduli of elasticity is imposed, which will further reduce ride comfort with an inflated tire.

SUMMARY OF THE INVENTION

In accordance with the present invention it has been found that as regards manufacture of self-supporting tires, unexpected advantages can be achieved if the tire carcass structure is formed with a plurality of strip-like lengths sequentially disposed along the circumferential extension of the tire. In this way it is in fact possible to regulate, depending on requirements, the control degree exerted by the carcass structure on the resilient stiffening inserts present therein.

In more detail, it is an object of the present invention to provide a self-supporting tire for vehicle wheels, characterized in that said at least one carcass ply comprises: axially inner strip-like lengths and axially outer strip-like lengths, said axially inner and axially outer lengths being circumferentially distributed around said rotation axis and extending each in a U-shaped configuration around the cross-section outline of the carcass structure, to define two side portions spaced apart from each other in an axial direction and a crown portion extending at a radially outer position between the side portions, said resilient stiffening inserts being each axially interposed between side portions of the axially inner lengths and side portions of the axially outer lengths.

The presence of axially intermediate strip-like lengths may be also provided and they are circumferentially distributed around said rotation axis and extend each in a U-shaped configuration around the cross-section outline of the carcass structure, to define two side portions that, at an axially outer position, overlap said resilient stiffening inserts, and a crown portion extending at a radially outer position between the side portions; and a pair of auxiliary resilient stiffening inserts each axially interposed between the side portions of the axially intermediate lengths and the side portions of the axially outer lengths.

In more detail, the axially inner lengths can be distributed following a circumferential pitch corresponding to a multiple of their width, the axially intermediate lengths are distributed following a circumferential pitch corresponding to a multiple of their width and have each the respective crown portion interposed in circumferential side by side relationship between the crown portions of two axially inner lengths, to define a first carcass ply together with the latter, and the axially outer lengths are distributed following a circumferential pitch substantially corresponding to their width, to define a second carcass ply which is radially superposed on the first carcass ply close to said crown portions.

The presence of second axially intermediate strip-like lengths may be also provided which are circumferentially distributed around said rotation axis and extend each in a U-shaped configuration around the cross-section outline of the carcass structure, to define two side portions partly overlapping, at an axially outer position, the side portions of the first axially intermediate lengths, and a crown portion extending at a radially outer position between the respective side portions.

In particular, the axially inner lengths can be distributed following a circumferential pitch substantially corresponding to a multiple of their width, whereas the first axially intermediate lengths are distributed following a circumferential pitch substantially corresponding to a multiple of their width, each having the respective crown portion interposed in circumferential side by side relationship between the crown portions of two axially inner lengths, to define a first carcass ply together with the latter, the second axially intermediate lengths are distributed following a circumferential pitch substantially corresponding to a multiple of their width, and the axially outer lengths are distributed following a circumferential pitch substantially corresponding to a multiple of their width, each having the respective crown portion interposed in circumferential side by side relationship between the crown portions of two axially intermediate lengths, to define a second carcass ply together with the latter, which second carcass ply is radially superposed on the first carcass ply close to said crown portions.

In a possible alternative embodiment, the axially inner lengths are distributed following a circumferential pitch substantially corresponding to their width, to define a first carcass ply, the axially intermediate lengths are distributed following a circumferential pitch corresponding to a multiple of their width, and the axially outer lengths are distributed following a circumferential pitch corresponding to a multiple of their width and have each the respective crown portion interposed in circumferential side by side relationship between the crown portions of two axially intermediate lengths, to define a second carcass ply together with the latter, said second carcass ply being radially superposed on the first carcass ply close to said crown portions.

In a further alternative embodiment the axially inner lengths are distributed following a circumferential pitch substantially corresponding to a multiple of their width, the axially outer lengths having each the respective crown portion interposed in circumferential side by side relationship between the crown portions of two axially inner lengths.

Alternatively, the axially inner and axially outer lengths may be provided to be distributed following a circumferential pitch corresponding to the width of each length, to define a first carcass ply and a second carcass ply radially superposed on the first carcass ply close to said crown portions, respectively.

A pair of auxiliary resilient stiffening inserts may be also provided and they are disposed each at an axially inner position with respect to the axially inner lengths.

In a further possible alternative embodiment, each of said strip-like lengths substantially extends in a plane offset in parallel relative to a meridian plane of the tire, so that the respective crown portion, with respect to a radial reference plane passing through the transition point between the crown portion and at least one of the corresponding side portions, is oriented at an angle of different value from the inclination angle of the side portions.

In more detail, the axially inner and axially outer lengths preferably lie in disposition planes that are offset on respectively opposite sides relative to said meridian plane, so that at least the side portions of the axially inner lengths have a crossed orientation with respect to the side portions of the axially outer lengths.

In accordance with a further aspect of the invention, each of said annular anchoring structures has at least one first portion axially interposed between the end portions of the axially inner and axially outer lengths.

In particular, the first portion of each of said annular anchoring structures is preferably provided to comprise: at least one first circumferentially-inextensible annular anchoring insert axially interposed between the end portions belonging to the axially inner and axially outer lengths, respectively; at least one first elastomer filling body extending from said first annular anchoring insert away from the geometric rotation axis and joining the respective resilient stiffening insert.

Each of the annular anchoring structures may in addition comprise at least one second portion disposed at an axially outer position with respect to the end portions belonging to the axially intermediate and the axially outer lengths, respectively.

The second portion too of each of the annular anchoring structures preferably comprises at least one second circumferentially-inextensible annular anchoring insert disposed at an axially outer position with respect to the end portions belonging to the axially outer lengths, and at least one second elastomer filling body extending from said second annular anchoring insert away from the geometric rotation axis.

It may be also provided that each of said annular anchoring structures should further comprise at least one auxiliary portion located at an axially inner position with respect to end portions of the axially inner lengths.

This auxiliary portion preferably comprises at least one auxiliary circumferentially-inextensible annular anchoring insert, disposed against the end portions of the axially inner lengths.

At least one of the above annular anchoring inserts may advantageously comprise at least one thread-like element disposed in radially superposed coils.

It is a further object of the present invention to provide a method of manufacturing a self-supporting tire for vehicle wheels, characterized in that preparation of the carcass structure involves the following steps: preparing strip-like lengths each comprising longitudinal and parallel thread-like elements; laying down axially inner strip-like lengths circumferentially distributed on the toroidal support, each of said axially inner lengths extending in a U-shaped configuration around the cross-section outline of the toroidal support, to define two side portions mutually spaced apart in an axial direction, and a crown portion extending at a radially outer position between the side portions; applying said resilient stiffening inserts at an axially outer position relative to the side portions of the axially inner lengths; laying down axially outer strip-like lengths circumferentially distributed on the toroidal support, each of said axially outer lengths extending in a U-shaped configuration around the cross-section outline of the toroidal support, to define two side portions mutually spaced apart in an axial direction, each extending at an axially outer position relative to one of the resilient stiffening inserts, and a crown portion extending at a radially outer position between the side portions.

In a possible embodiment, before deposition of the axially outer lengths the following further steps are carried out: laying down axially intermediate strip-like lengths circumferentially distributed around said rotation axis and each extending in a U-shaped configuration around the cross-section outline of the carcass structure to define two side portions overlapping, at an axially outer position, said resilient stiffening inserts, and a crown portion extending at a radially outer position between the side portions; applying a pair of auxiliary resilient stiffening inserts at an axially outer position relative to the side portions of the axially intermediate lengths, before deposition of the axially outer lengths.

In particular, it may be provided that the axially inner lengths should be laid down following a circumferential distribution pitch substantially corresponding to a multiple of their width, that the axially intermediate lengths should be laid down following a circumferential distribution pitch substantially corresponding to a multiple of their width, each having the respective crown portion interposed in circumferential side by side relationship between the crown portions of two axially inner lengths, to define a first carcass ply together with the latter, and that the axially outer lengths should be laid down following a circumferential distribution pitch substantially corresponding to their width, to define a second carcass ply radially superposed on the first carcass ply.

In a possible preferential embodiment, before application of said auxiliary resilient stiffening insert, also carried out is the step of laying down second axially-intermediate strip-like lengths circumferentially distributed around said rotation axis and each extending in a U-shaped configuration around the cross-section outline of the toroidal support, to define two side portions partly overlapping, at an axially outer position, the side portions of the first axially intermediate lengths laid down beforehand, and a crown portion extending at a radially outer position between the respective side portions.

In particular, the axially inner lengths are preferably laid down following a circumferential distribution pitch substantially corresponding to a multiple of their width, the first axially intermediate lengths are laid down following a circumferential distribution pitch substantially corresponding to a multiple of their width, each having the respective crown portion interposed in circumferential side by side relationship between the crown portions of two axially inner lengths, to define a first carcass ply together with the latter, the second axially intermediate lengths are laid down following a circumferential distribution pitch substantially corresponding to a multiple of their width, and the axially outer lengths are laid down following a circumferential distribution pitch substantially corresponding to a multiple of their width, each having the respective crown portion interposed in circumferential side by side relationship between the crown portions of two of said second axially intermediate lengths, to define a second carcass ply together with the latter.

Alternatively, the axially inner lengths can be laid down following a circumferential distribution pitch substantially corresponding to their width, to define a first carcass ply, whereas the axially intermediate lengths are laid down following a circumferential distribution pitch substantially corresponding to a multiple of their width, and the axially outer lengths are laid down following a circumferential distribution pitch substantially corresponding to a multiple of their width, each having the respective crown portion interposed in circumferential side by side relationship between the crown portions of two of said intermediate lengths, to define a second carcass ply together with the latter, said second carcass ply being radially superposed on the first carcass ply close to said crown portions.

In a further possible embodiment, the axially inner lengths are distributed following a circumferential pitch substantially corresponding to a multiple of their width, the axially outer lengths being each laid down so that their crown portion is in circumferential side by side relationship between the crown portions of two axially inner lengths.

Alternatively, the axially inner lengths are distributed following a circumferential pitch substantially corresponding to their width, to define a first carcass ply and the axially outer lengths are distributed following a circumferential pitch substantially corresponding to their width, to define a second carcass ply radially superposed on the first carcass ply close to said crown portions.

Also preferably provided is a step of arranging a pair of auxiliary resilient stiffening inserts, disposed each at an axially inner position with respect to the axially inner lengths.

Each of said strip-like lengths may be also laid down in a plane offset in parallel to a meridian plane of the toroidal support.

In particular, the axially inner lengths and axially outer lengths are preferably laid down following deposition planes respectively, that are offset on respectively opposite sides relative to said meridian plane, so that the side portions of the axially inner lengths and axially outer lengths have respectively inclined orientations.

In accordance with a further inventive aspect, accomplishment of each of said annular anchoring structures comprises the step of forming at least one first portion of the annular anchoring structure at an axially outer position relative to the end portions of the axially inner lengths previously laid down on the toroidal support, before deposition of the axially outer lengths.

In particular, formation of the first portion of each of said annular anchoring structures preferably comprises the steps of: applying at least one first circumferentially-inextensible annular insert at an axially outer position relative to the end portions of the axially inner lengths laid down on the toroidal support, applying at least one first elastomer filling body extending from said annular anchoring insert away from the geometric rotation axis and joining the respective resilient stiffening insert.

It may be also provided that accomplishment of said annular anchoring structures should comprise the further step of forming at least one second portion of the annular anchoring structure against the end portions of the axially outer lengths.

Formation of the second portion of each of said annular anchoring structures may advantageously comprise the steps of: applying at least one second circumferentially-inextensible annular anchoring insert at an axially outer position relative to the end portions of the axially outer lengths, applying at least one second elastomer filling body extending from said second annular anchoring insert away from the geometric rotation axis.

Accomplishment of each of said annular anchoring structures may also comprise the step of forming at least one auxiliary portion on the toroidal support before deposition of the axially inner lengths.

Preferably, at least one of said annular anchoring inserts is formed through winding of at least one continuous thread-like element in radially superposed coils.

It is also preferably provided that at least one of said elastomer filling bodies should be formed through winding of at least one continuous thread-like element of elastomer material in coils disposed in axial side by side relationship and/or in radial superposition relationship around the geometric axis of the toroidal support.

Each of said resilient stiffening inserts too can be advantageously formed through winding of at least one continuous thread-like element of elastomer material in coils disposed in axial side by side relationship and/or in radial superposition relationship around the geometric axis of the toroidal support.

BRIEF DESCRIPTION OF THE DRAWINGS

Further features and advantages will become more apparent from the detailed description of a preferred, but not exclusive, embodiment of a method of manufacturing a carcass structure for vehicle wheel tires and of a carcass structure to be manufactured with said method, in accordance with the present invention. This description will be set forth hereinafter with reference to the accompanying drawings, given by way of non-limiting example, in which.

DETAILED DESCRIPTION OF THE PREFERRED EMBODIMENTS

Figure 1:
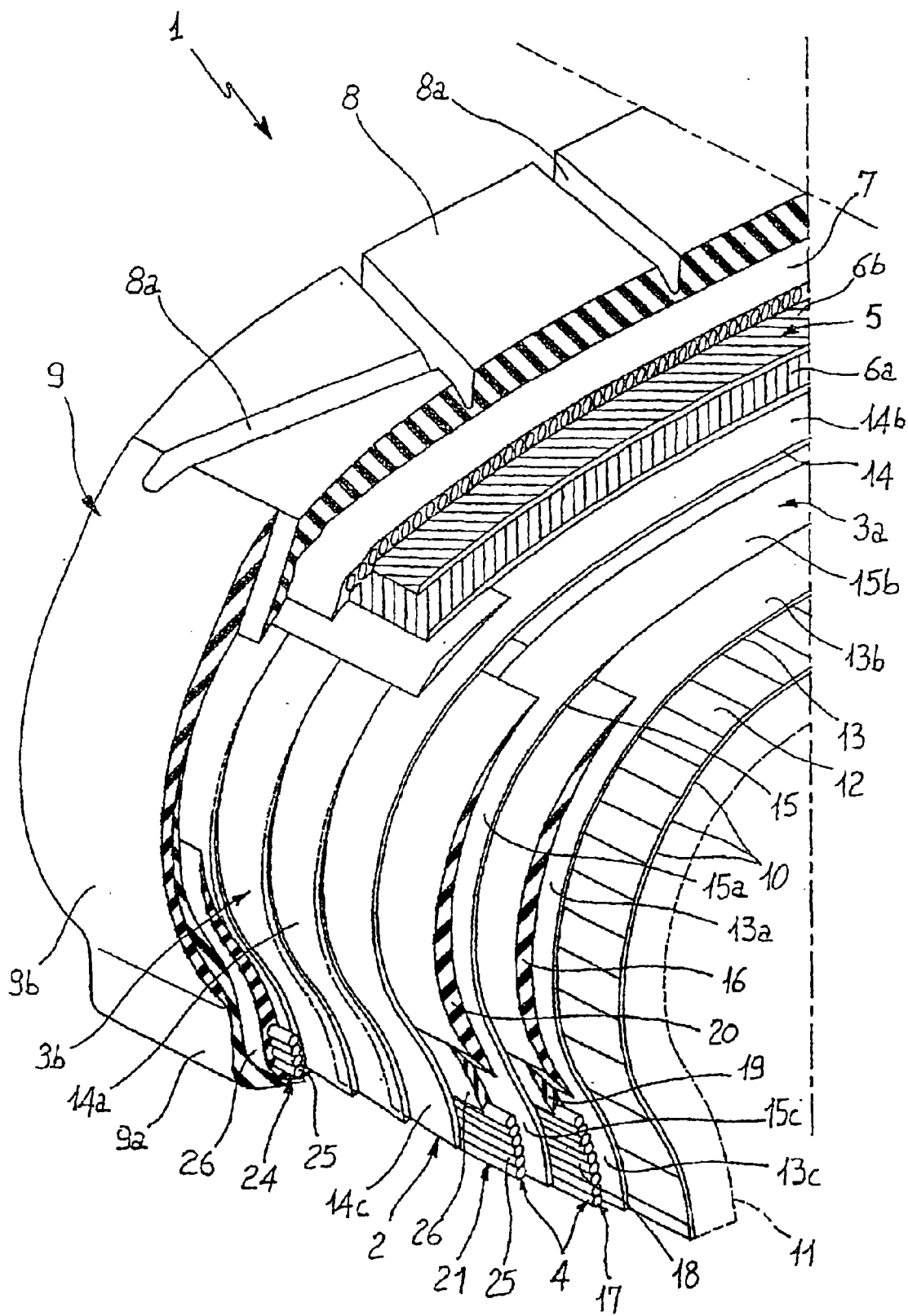
FIG. 1 is a fragmentary and cut-away perspective view of a tire made in accordance with the present invention.
Figure 2:
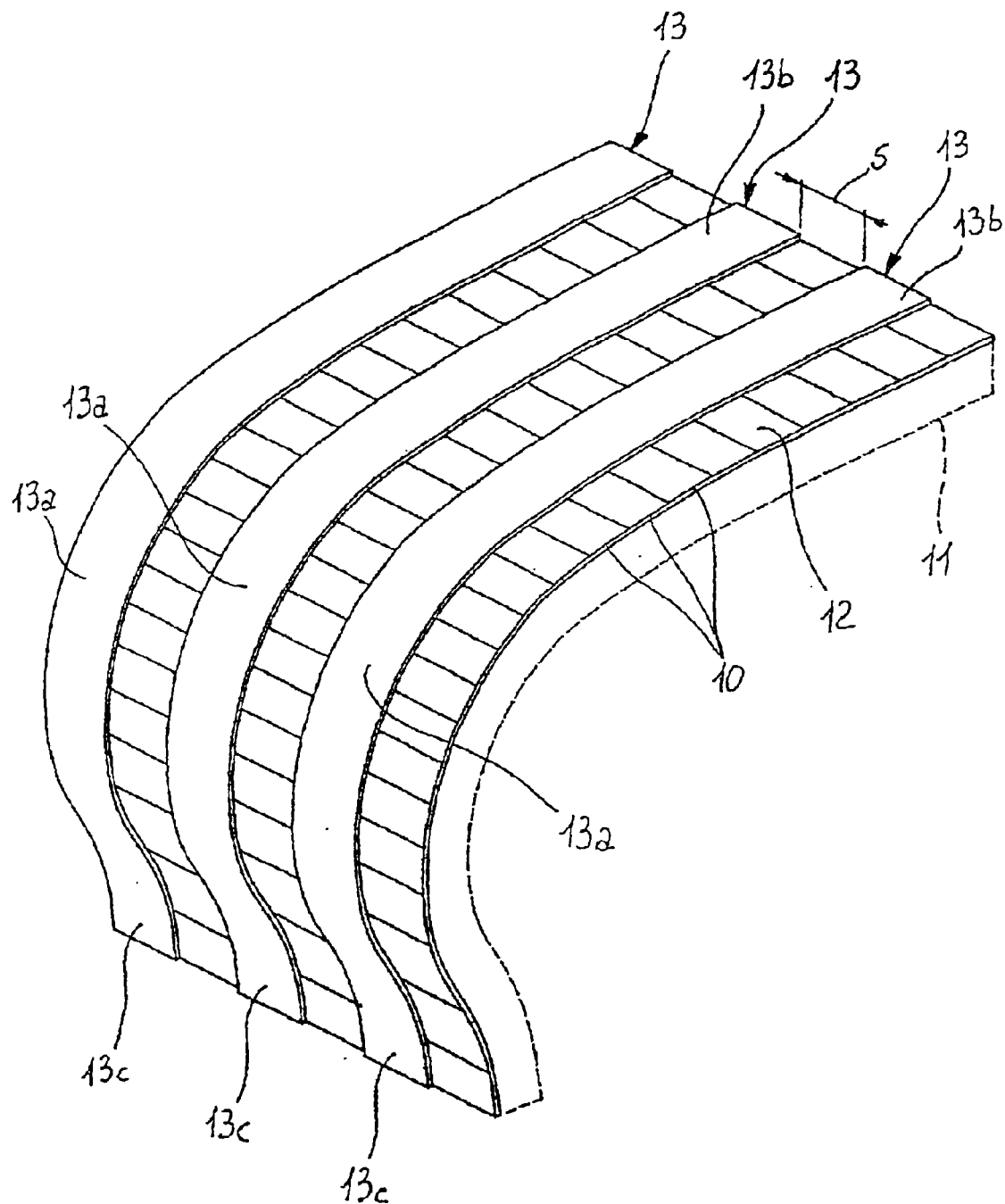
FIG. 2 is a fragmentary perspective view diagrammatically showing the deposition sequence of the axially inner strip-like lengths, intended for formation of a carcass ply of the tire in accordance with the invention.
Figure 3:
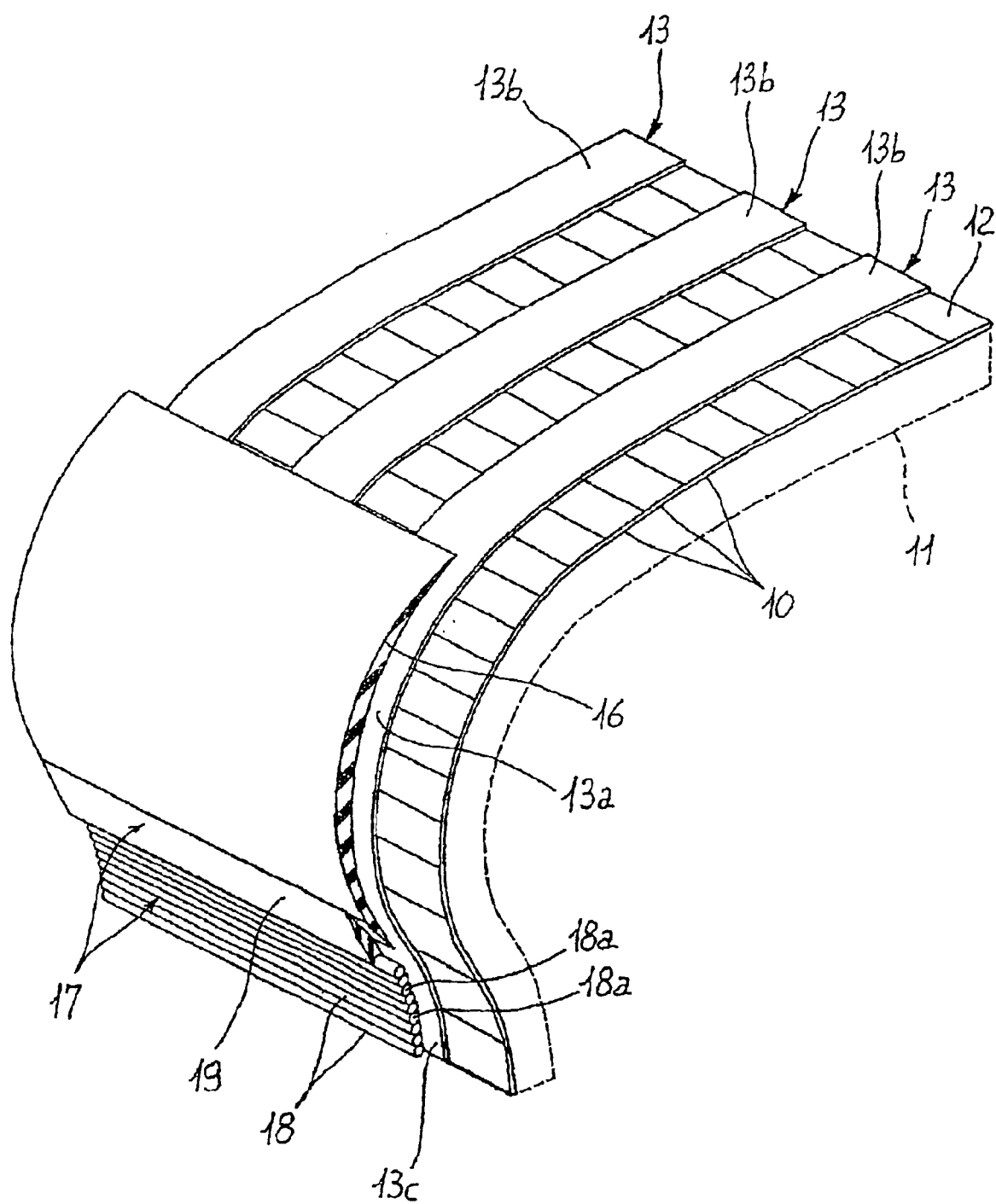
FIG. 3 is a fragmentary perspective view showing application of a resilient stiffening insert and an auxiliary portion being part of an annular reinforcing structure to one of the sides of the carcass structure.

With reference to the drawings, a tire for vehicle wheels having a carcass structure 2 made with the method of the present invention has been generally identified by reference numeral 1.

In the embodiment shown in FIGS. 1 to 7, the carcass structure 2 has a first and a second carcass plies 3a, 3b having a substantially toroidal configuration and engaged, through their circumferentially opposite edges, with a pair of annular anchoring structures 4 (only one of which is shown in the drawings) each of which, when the tire has been completed, is placed at the tire region usually identified as "bead", to ensure anchoring of tire 1 to a corresponding mounting rim.

Applied to the carcass structure 2, at a radially outer position thereof, is a belt structure 5 comprising one or more belt strips 6a, 6b and 7. A tread band 8 circumferentially overlaps the belt structure 5 and in said tread band, following a moulding operation carried out simultaneously with the tire polymerization, longitudinal and transverse grooves 8a are formed and conveniently disposed so as to define a desired "tread pattern".

Tire 1 further comprises a pair of so-called "sidewalls" 9, laterally applied to the carcass structure 2 on opposite sides thereof and comprising each a radially inner portion 9a and a radially outer portion 9b.

The carcass structure 2 may be possibly coated on its inner walls, with a so-called "liner" 10, essentially made of at least one layer of air-proof elastomer material adapted to ensure the air-tightness of the inflated tire.

Assembling of the above listed components, as well as manufacture of one or more of same, takes place with the aid of a toroidal support 11, diagrammatically shown in FIG. 1, having the shape of the inner walls of the tire to be made.

The toroidal support 11 may have reduced sizes as compared with those of the finished tire, according to a linear amount preferably included between 2% and 5% and measured, just as an indication, along the circumferential extension of the support itself at an equatorial plane X—X thereof which is coincident with the equatorial plane of the tire.

The toroidal support 11, which is not described or illustrated in detail because it is not of particular importance to the aims of the invention, may for example consist either of a collapsible or dismountable drum or of an inflatable bladder suitably reinforced so that it may take and maintain the desired toroidal conformation under inflated conditions.

After taking into account the above statements, manufacture of tire 1 first involves formation of the carcass structure 2 starting with possible formation of liner 10.

This liner 10 can be advantageously made by circumferentially winding up around the toroidal support 11, at least one ribbon-like band 12 of an air-proof elastomer material, produced from an extruder and/or a calender located close to the toroidal support itself. As viewed from FIG. 1, winding of the ribbon-like band 12 substantially takes place in circumferential coils consecutively disposed in side by side relationship to follow the cross-section outline of the outer surface of the toroidal support 11.

For descriptive purposes, by "cross-section outline" it is herein intended a configuration exhibited by the half-section of the toroidal support 11 sectioned along a plane radial to a geometric rotation axis thereof, not shown in the drawings, which is coincident with the geometric axis of rotation of the tire and, therefore, of the carcass structure 2 being manufactured.

In accordance with the present inventions the carcass ply or plies 3a, 3b are directly formed on the toroidal support 11 by depositing thereon, as better clarified in the following, strip-like lengths that, in the course of the present description, will be identified as axially inner lengths 13, axially outer lengths 14 and axially intermediate lengths 15 respectively, depending on their positioning within the carcass structure 2. The strip-like lengths 13, 14, 15 are advantageously formed of at least one continuous strip-like element preferably having a width included between 3 mm and 15 mm, essentially consisting of thread-like elements of textile or metallic material longitudinally disposed and at least partly incorporated into one or more layers of elastomer material.

This continuous strip-like element can be advantageously produced from a calender or an extruder installed in the vicinity of the toroidal support 11 on which tire 1 is formed, to be guided to a deposition apparatus adapted to sequentially cut it to form the strip-like lengths 13, 14 and 15 concurrently with deposition of said lengths onto the toroidal support itself.

More specifically, the cutting operation of each strip-like length 13, 14, 15 is immediately followed by deposition of the length itself on the toroidal support 11, giving the strip-like length a U-shaped conformation around the cross-section outline of said toroidal support, in such a manner that in the strip-like lengths 13, 14, 15 two side portions 13a, 14a, 15a can be identified, which side portions radially extend towards the axis of the toroidal support 11, at positions axially spaced apart from each other, as well as a crown portion 13b, 14b, 15b extending at a radially outer position between the side portions.

Due to the sticky character of the preferably green elastomer material forming the continuous strip-like element and therefore the strip-like lengths 13, 14, 15, a steady adhesion of the latter to the surfaces of the toroidal support 11 is ensured, even in the absence of liner 10 on said toroidal support.

Further details about the structural features and modalities for making and laying down the continuous strip-like element and the strip-like lengths 13, 14, 15 are described in documents EP 928 680 and EP 928 702 in the name of the same Applicant, contents of which are considered as herein integrally incorporated.

The toroidal support 11 can be driven in angular rotation according to a step-by-step movement in synchronism with operation of said deposition apparatus, in such a manner that each cutting action of each strip-like length 13, 14, 15 is followed by deposition of said length at a position circumferentially spaced apart from the previously laid down length 13, 14, 15.

In more detail, rotation of the toroidal support 11 takes place following angular-movement steps to each of which corresponds a circumferential displacement that, depending on requirements, can be substantially equal to the width of each strip-like length 13, 14, 15, or substantially equal to a multiple of this width. Consequently, the strip-like lengths 13, 14, 15 will be laid down following a circumferential distribution pitch substantially equal to their width, or to a multiply of this amount. It should be pointed out that to the aims of the present description, when not otherwise stated, the term "circumferential" refers to a circumference lying in the equatorial plane X—X and close to the outer surface of the toroidal support 11.

In particular, in the embodiment referred to in FIGS. 1 to 7, the angular movement of the toroidal support 11 takes place in such a manner that, by a first complete revolution of the toroidal support around its own axis, deposition of the axially inner lengths 13 takes place, which lengths are circumferentially distributed according to a circumferential pitch equal to twice the width of each of them. Therefore, as clearly viewed from FIG. 2, between two axially inner lengths 13 an empty space "S" is left that, at least at the crown portions 13b of the lengths themselves, has a width substantially corresponding to that of said lengths.

If necessary, deposition of the axially inner strip-like lengths 13 may take place to an inclined orientation with respect to the circumferential extension direction of the toroidal support, at an angle included between 15° and 35°, for example.

Adjustment of the deposition angle of the strip-like lengths can be obtained for example by suitably orienting the geometric rotation axis of the toroidal support with respect to the deposition apparatus.

Deposition of each axially inner length 13, as well as subsequent deposition of the axially outer 14 and/or intermediate 15 lengths may be advantageously provided to be carried out in deposition planes offset in parallel with respect to a meridian plane of the toroidal support 11, as described in the Patent Application PCT/EP 99/09389 in the name of the same Applicant, contents of which are considered as herein completely incorporated. By so doing, each side portion 13a, 14a, 15a of each strip-like length 13, 14, 15 will form, with respect to a plane radial to the geometric axis of the toroidal support 11 passing through the transition point between the side portion itself and the respective crown portion 13b, 14b, 15b, an angle of a different value from the angle formed by the same crown portion with respect to the same radial plane. In particular, in this way a desired inclination will be given to each side portion 13a, 14a, 15a relative to a direction radial to the geometric axis of the toroidal support 11, while keeping the crown portion 13b, 14b, 15b in a plane radial to the geometric axis itself.

When deposition of the axially inner lengths 13 has been carried out over the whole circumferential extension of the toroidal support 11 accomplishment of the carcass structure 2 goes on with the step of applying at least one pair of resilient stiffening inserts 16 (only one of which is shown in the accompanying figures), each at an axially outer position against the side portions 13a of the axially inner lengths 13.

In more detail, as viewed from the figures, each resilient stiffening insert 16, preferably having a hardness included between 67 and 91 IRHD, has a cross-section outline substantially in the form of a lunette, gradually tapering towards a radially inner apex 16a thereof, located close to the respective annular anchoring structure 4, and towards a radially outer apex 16b thereof, located, just as an indication, at a shoulder region of the tire, where transition between the side portions 13a, 14a, 15a and crown portions 13b, 14b, 15b of the strip-like lengths 13, 14, 15 takes place.

Advantageously, each of the resilient stiffening inserts 16 can be directly formed against the side portions 13a, by winding up a continuous strip of elastomer material, ejected from an extruder operating close to the toroidal support 11 in coils disposed in axial side by side relationship and/or radial superposition relationship. The continuous strip can have the final section conformation of the resilient stiffening insert 16 already on its coming out of the respective extruder. However, it is preferable for the continuous strip to have a reduced section than that of the resilient stiffening insert 16, said insert being obtained by application of the strip itself in several coils disposed in side by side and/or superposition relationship, to define the reinforcing insert itself in its final configuration. For further details concerning accomplishment of each resilient stiffening insert 16, please refer to that which is described in the Patent Application PCT/IT 99/00376 and/or in the Patent Application PCT/IT 99/00377, both in the name of the same Applicant.

Concurrently with formation of the resilient stiffening inserts 16, auxiliary portions 17 of the above-mentioned annular anchoring structures 4 are applied to the region close to each of the inner circumferential edges of the carcass ply 3 being manufactured.

In the embodiment shown in FIGS. 1 to 7, each of said auxiliary portions 17 comprises at least one auxiliary circumferentially-inextensible annular insert 18, which is substantially in the form of a crown concentric with the geometric rotation axis of the toroidal support 11 and is located at a circumferentially inner position against end portions 13c exhibited by the axially inner lengths 13.

The auxiliary annular insert 18 is preferably made up of at least one metallic strip-like element wound up in several substantially concentric coils 18a. Coils 18a can be defined either by a continuous spiral or by concentric rings formed with respective strip-like elements.

Combined with the auxiliary annular insert 18 is an auxiliary filling body 19 of elastomer material, preferably of the thermoplastic type, of a hardness included between 80 and 90 IRHD, extending radially from the annular insert away from the geometric rotation axis of the toroidal support 11 and joining the respective resilient stiffening insert 16 at the inner apex 16a of the latter.

In accordance with a preferential embodiment, the auxiliary annular insert 18 is directly formed against the end f laps of the strip-like lengths 13, forming coils 18a through winding up of the strip-like element possibly with the aid of rollers or other convenient means acting against the surface of the toroidal support 11.

The sticky character of the elastomer layer coating the strip-like lengths 13, as well as the possible liner 10 previously laid down on the toroidal support, ensures steady positioning of the individual coils 18a during the formation step of same.

Subsequently, the auxiliary filling body 19 can be, in turn, directly formed against the auxiliary annular insert 18, by applying a continuous strip of elastomer material coming out of an extruder located close to the toroidal support 11 for example, in the same manner as said with reference to formation of the resilient stiffening inserts 16.

After application of the auxiliary portions 17 of the annular anchoring structures 4, formation of the first carcass ply 3a is completed by deposition of the axially intermediate lengths 15 on the toroidal support 11 in the same manner as described for the axially inner lengths 13.

Figure 4:
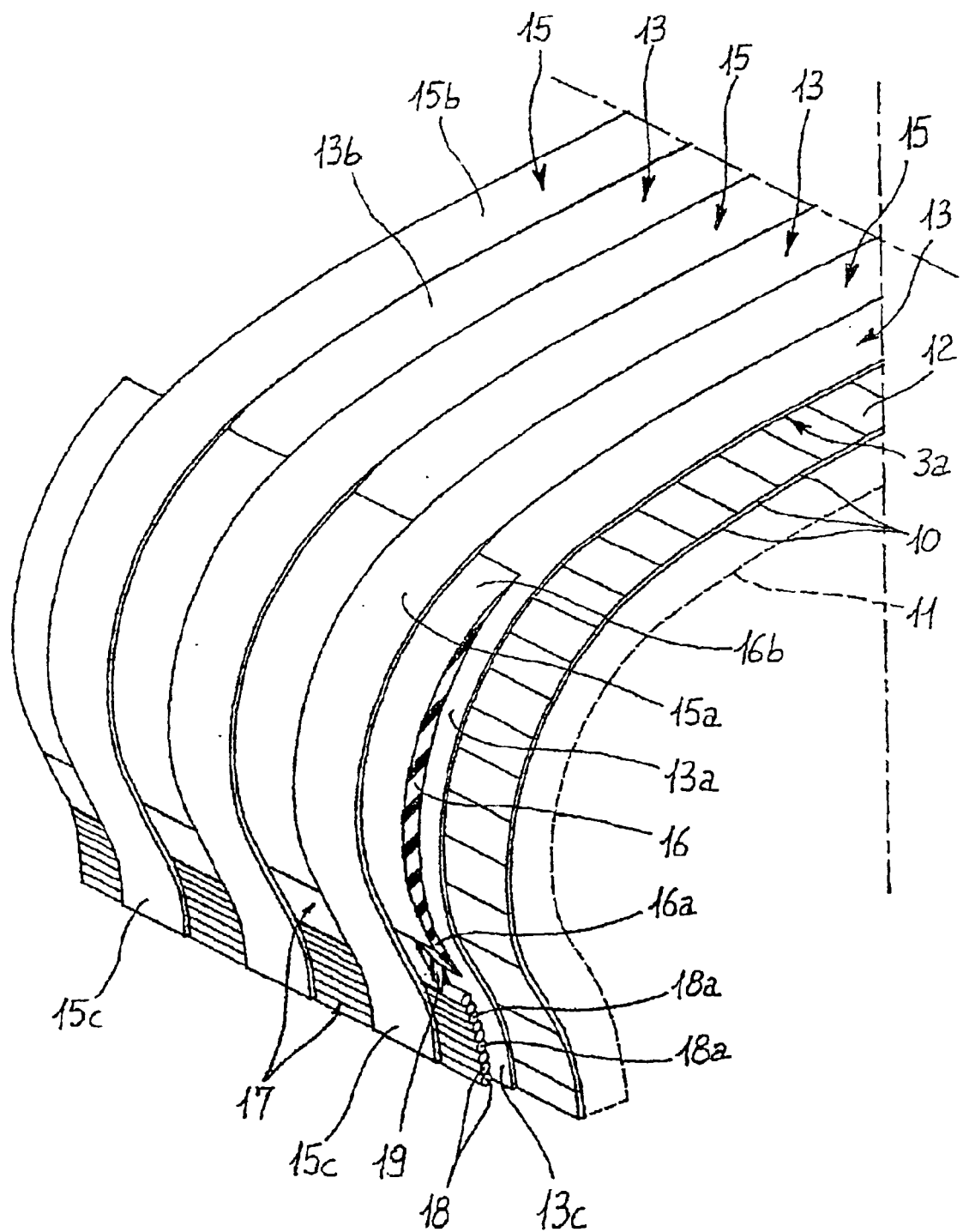
FIG. 4 is a fragmentary perspective view showing application of intermediate strip-like lengths the side portions of which overlap the previously applied resilient stiffening insert and auxiliary portion.
Figure 5:
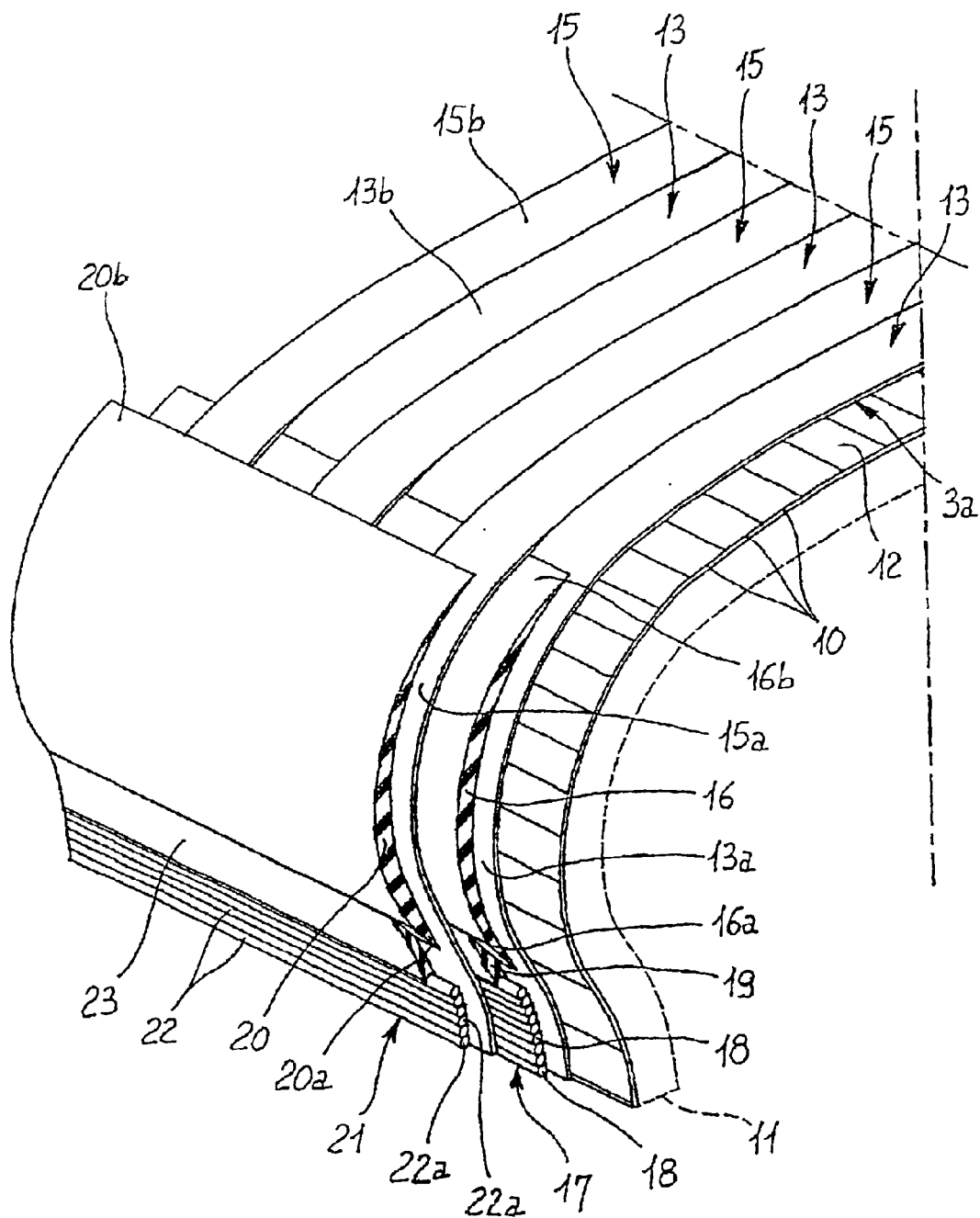
FIG. 5 is a fragmentary perspective view showing an auxiliary resilient stiffening insert and the first portion of the annular anchoring structure applied against the side portions of the first axially intermediate lengths.
Figure 6:
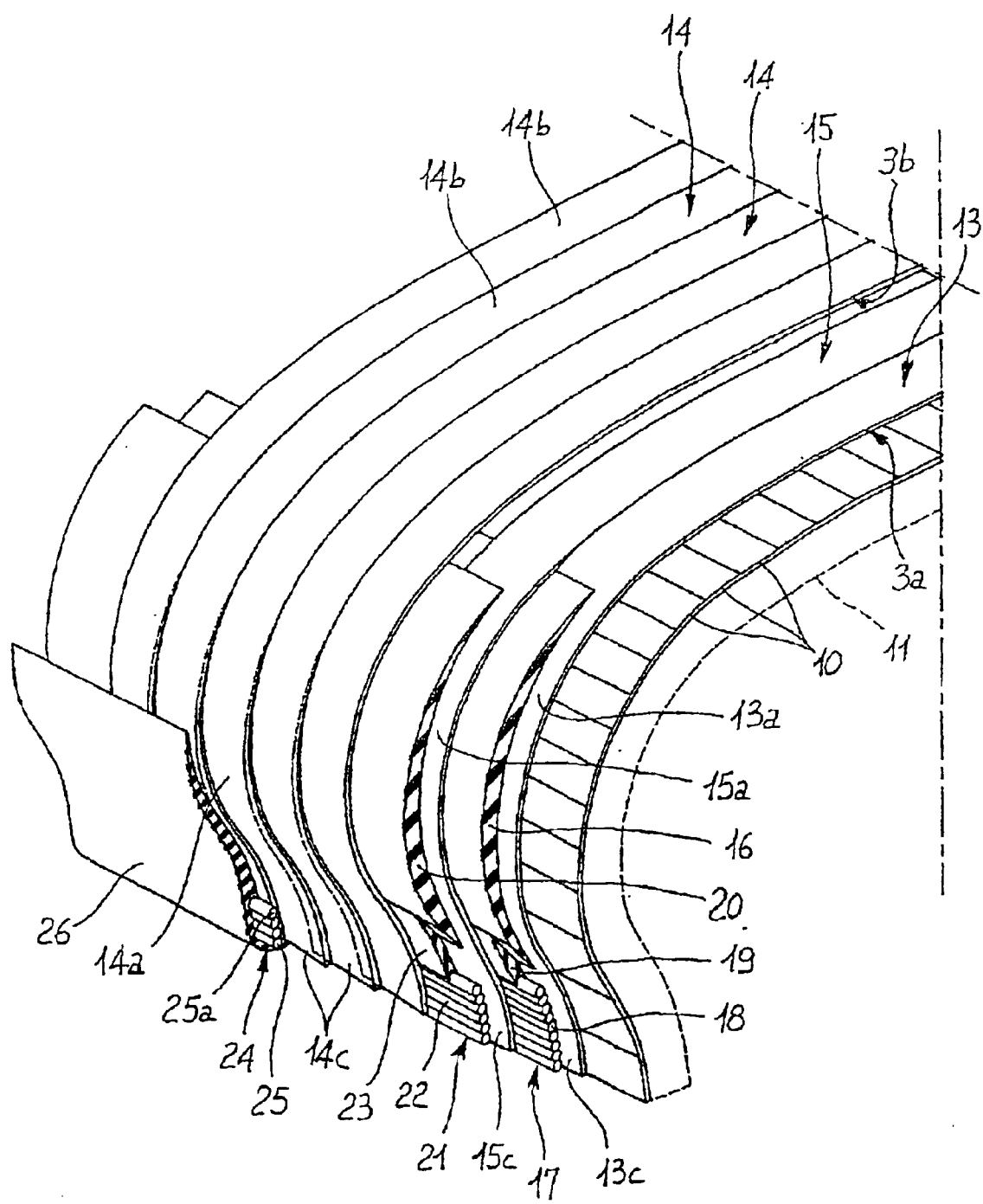
FIG. 6 shows, still in fragmentary perspective view, axially outer strip-like lengths applied with their respective side portions against the auxiliary resilient bearing insert, and a second portion of the annular anchoring structure applied against end portions of the axially outer lengths, on the opposite side from said first portion.
Figure 7:
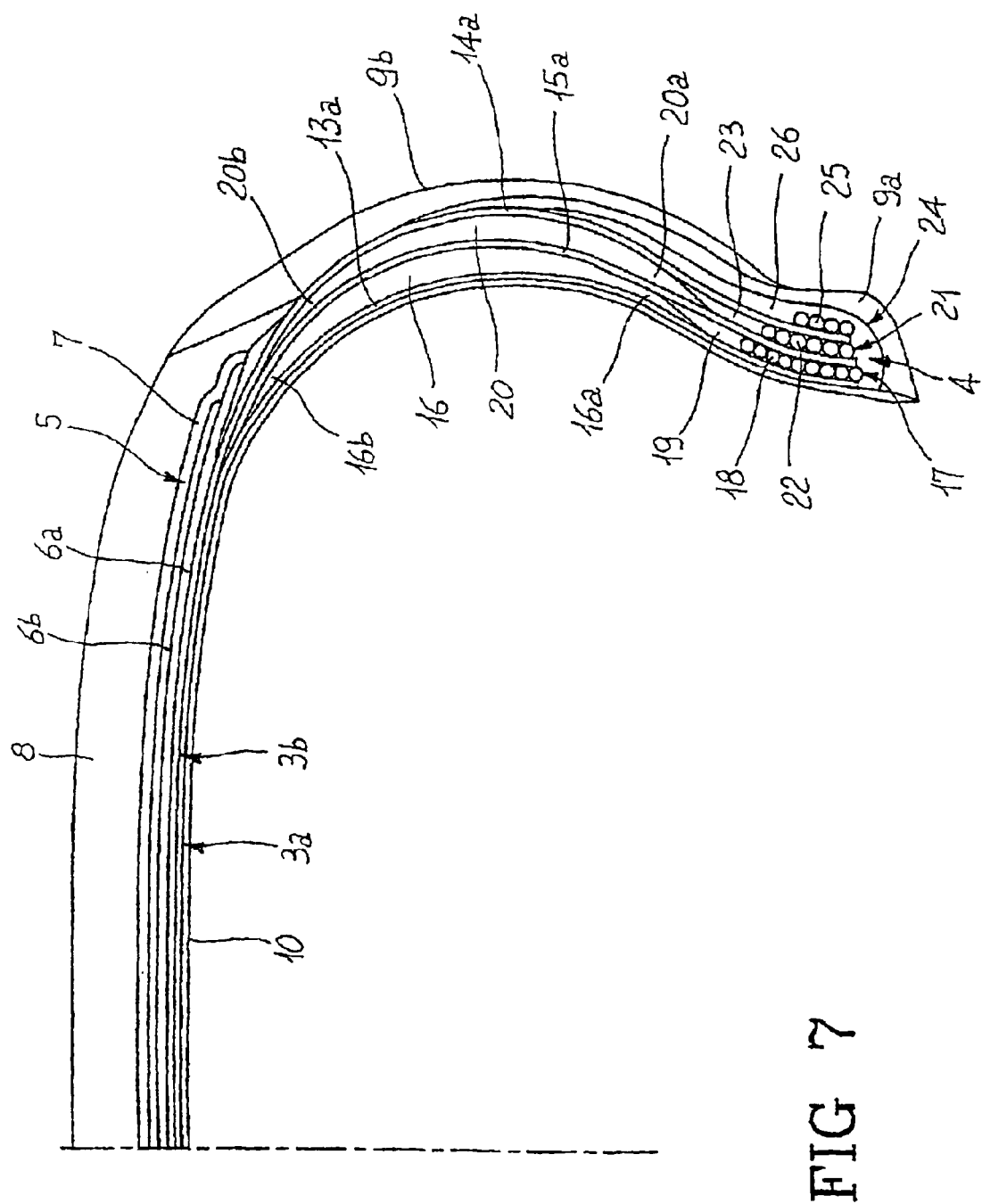
FIG. 7 is a cross half-section of the tire made in accordance with the preceding figures.

As clearly viewed from FIG. 4, each intermediate length 15 is laid down in such a manner that its crown portion 15b is circumferentially interposed between the crown portions 13b of the axially inner lengths 13, to fill the space "S" existing therebetween. The side portions 15a of each intermediate length 15 are superposed, at an axially outer position, on the resilient stiffening elements 16, and carry the end portions 15c of the length itself in superposed relationship with the respective auxiliary portions 17 of the annular anchoring structures 4, at an axially opposite position relative to the end portions 13c of the axially inner lengths 13.

After deposition of the axially intermediate strip-like lengths 15 has been carried out in the above described manner, on each of the opposite sides of the carcass structure 2 being manufactured at least one auxiliary resilient stiffening insert 20 is applied, said insert having a cross-section outline substantially in the form of a "lunette", respectively tapering on opposite sides respectively towards a radially inner apex 20a located close to the respective annular anchoring structure 4 and a radially outer apex 20b located in the shoulder region of the tire. Each auxiliary insert 20, preferably made of elastomer material of a hardness included between 67 and 91 IRHD, can be advantageously directly formed against the side portions 15a of the axially intermediate lengths 15, in the same manner as described with reference to the manufacture of the resilient stiffening inserts 16.

Then application of the first portions 21 of the annular anchoring structures 4 against the end portions 15 of the axially intermediate strip-like lengths 15 is carried out, at axially opposite position relative to said auxiliary portions 17.

As can be seen in the figures, each of the first portions 21 is preferably structured in the same manner as described with reference to the auxiliary portions 17.

More particularly, each first portion 21 has a respective first circumferentially inextensible annular insert 22 formed of at least one respective strip-like element disposed in concentric coils 22a to form a circular crown disposed coaxial with the carcass structure 2 and close to the inner circumferential edges of the carcass plies 3a, 3b.

Combined with the first annular insert 22, disposed against the end portions 15c of the axially intermediate strip-like lengths 15, is a first filling body 23 of elastomer material, having the same shape as the auxiliary filling body 19.

Accomplishment and application of the first annular insert 22 and of the first filling body 23, i.e. the first portion 21 taken as a whole, can take place following any modalities previously described with reference to the auxiliary portion 17.

Then formation of the second carcass ply 3b begins by deposition of the axially outer strip-like lengths 14. This deposition step can be carried out in the same manner as described with reference to deposition of the axially 13 and intermediate 15 lengths or in a similar manner.

In a convenient embodiment, the axially outer strip-like lengths 14 are laid down in crossed orientation relative to the inner 13 and intermediate 15 lengths, preferably at a symmetrically opposite angle with respect to the last-mentioned lengths, with reference to the circumferential extension direction of the carcass structure 2.

Deposition of the axially outer strip-like lengths 14 preferably takes place according to a circumferential pitch substantially equal to their width, in order to complete formation of the second carcass ply 3b following carrying out of a single complete revolution by the toroidal support 11 around its rotation axis.

When deposition has been completed, each of the auxiliary resilient stiffening inserts 20 is interposed between the side portions 15a of the axially intermediate lengths 15 and the side portions 14a of the axially outer lengths 14.

In accordance with a preferential embodiment of the invention, after carrying out deposition of the axially outer strip-like lengths 14, formation of the annular structures 4 for anchoring to the beads is completed.

To this aim, for each of the annular anchoring structures 4 provision is made for application of a second portion 24 against the end portions 14c of the axially-outer strip-like sections 14.

Preferably, each second portion 24 is essentially made up of at least one second annular insert 25 formed of coils 25a disposed crownwise, in the same manner as said with reference to formation of the first annular insert 22 and the auxiliary annular insert 18.

After this operation, each of the end portions 14a of the axially outer lengths 14 is advantageously enclosed between the first and second portions 21, 24 of the respective annular anchoring structure 4. In addition, a second filling body 26 and a second auxiliary filling body can be associated with each second portion 24, the second filling body being formed in the same manner as described with reference to the first filling body 23 and the second auxiliary filling body being designed to complete formation of the annular anchoring structure 4.

In tires of the radial type, a belt structure 5 is usually applied to the carcass structure 2.

This belt structure 5 may be made in any manner convenient for a person skilled in the art and in the embodiment shown it essentially comprises a first and a second belt strips 6a, 6b formed of cords having a respectively crossed orientation. Superposed on the belt strips 6a, 6b is an auxiliary belt strip 7, for instance obtained by winding up at least one continuous cord in substantially circumferential coils axially disposed in side by side relationship on said belt strips.

Then the tread band 8 is applied to the belt structure 5, whereas to the side portions of the carcass structure 2 are applied the sidewalls 9, which are also obtained in any manner convenient for a person skilled in the art.

Embodiments of a belt structure, sidewalls and a tread band that can be advantageously adopted for a complete accomplishment of tire 1 on the toroidal support 11 are described in document EP 919 406, in the name of the same Applicant.

Tire 1 as manufactured is now ready to be submitted, possibly after removal from support 11, to a vulcanization step that can be carried out in any known and conventional manner.

Figure 8:
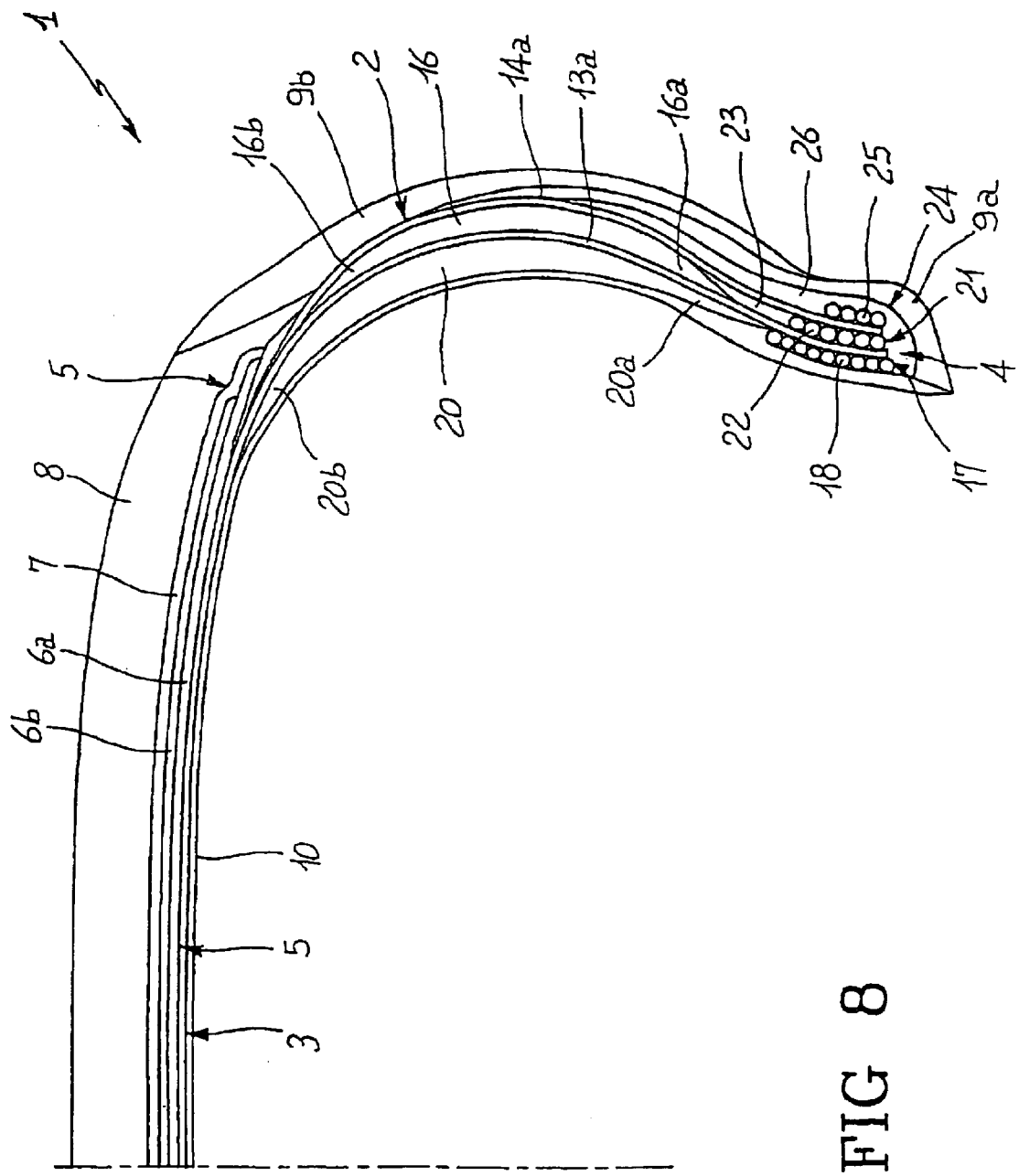
FIG. 8 is a diametrical half-section of a second embodiment of a tire in accordance with the present invention.
Figure 9:
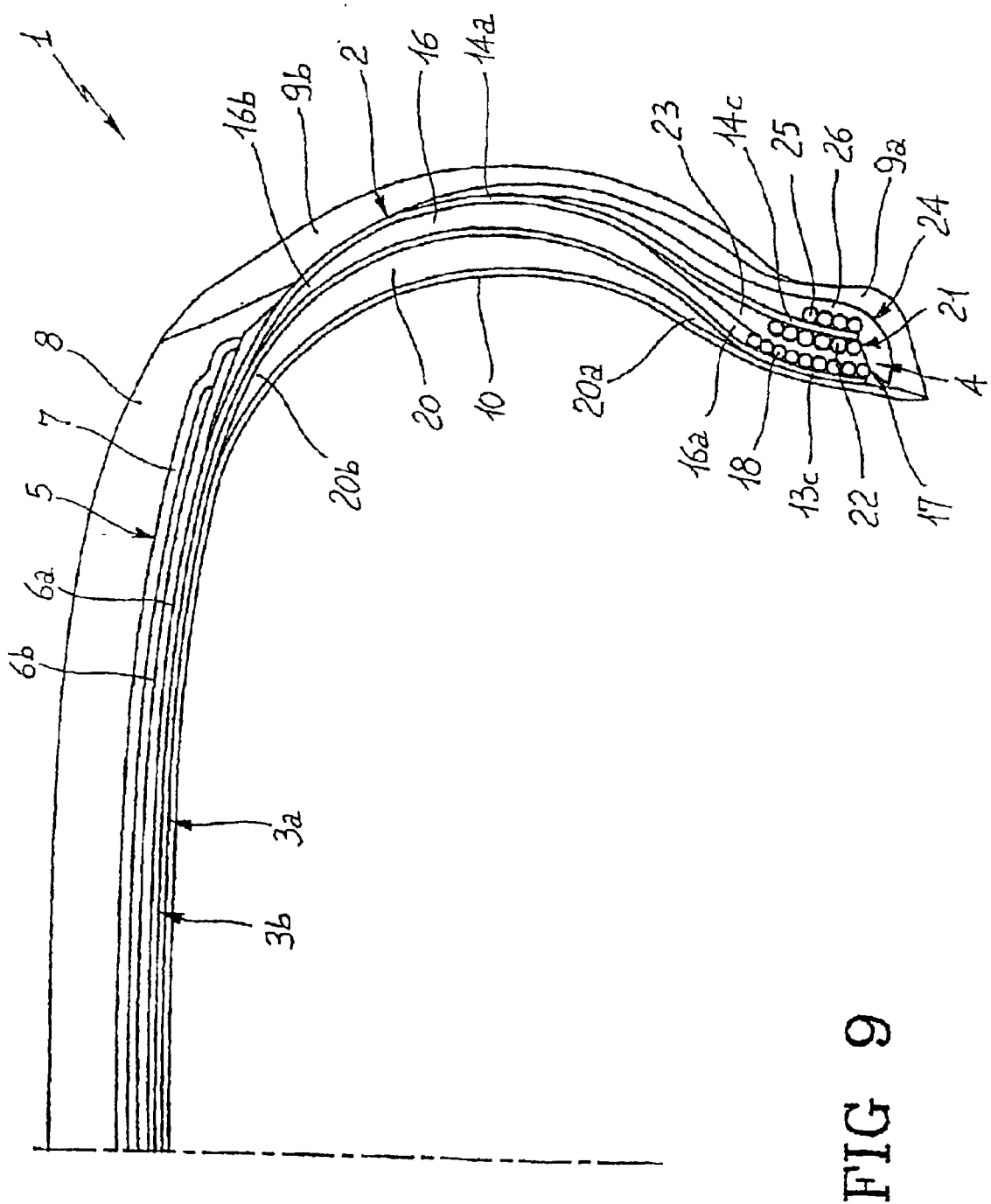
FIG. 9 is a diametrical section of a further alternative embodiment of a tire in accordance with the invention.
Figure 10:
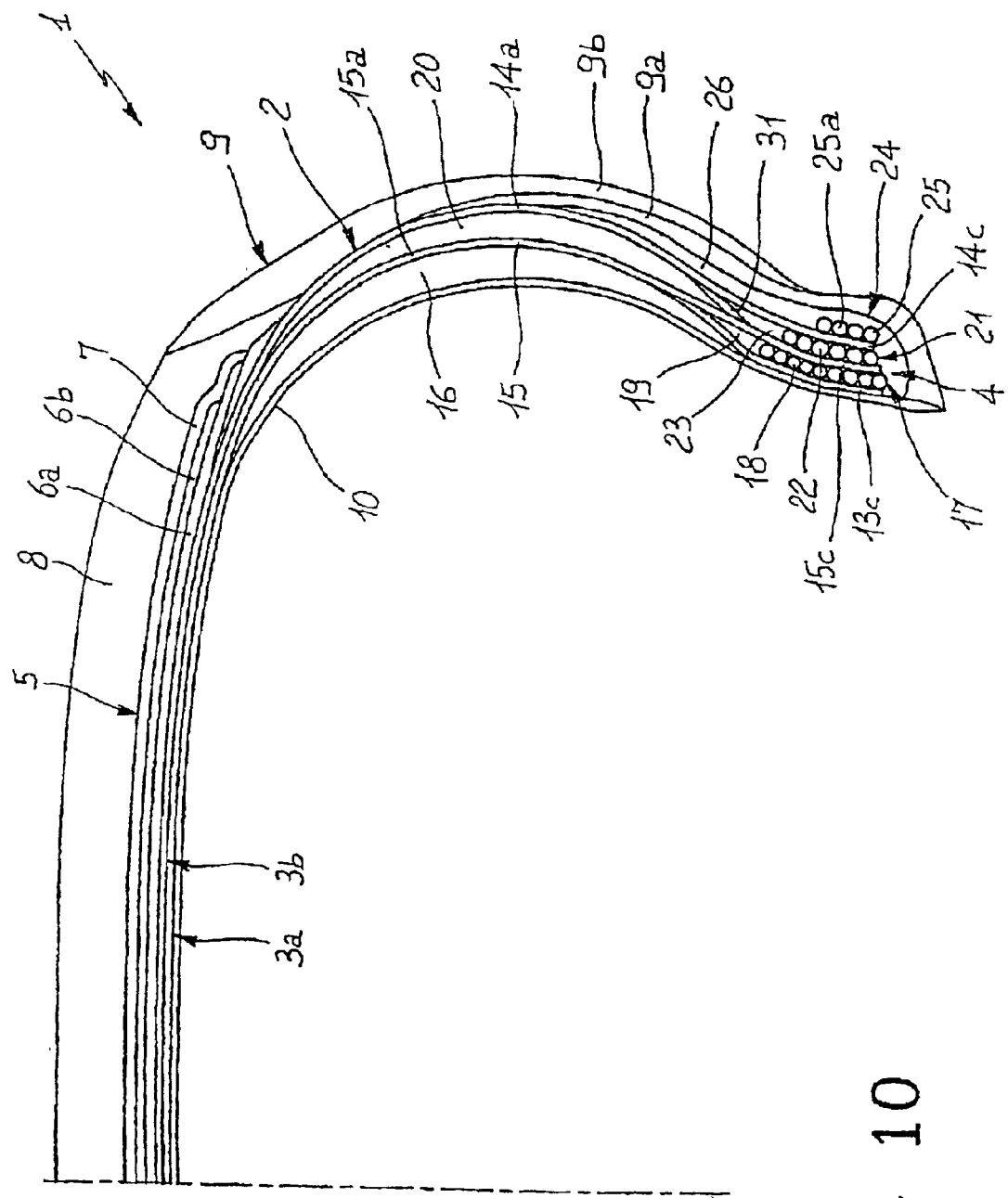
FIG. 10 shows, still in diametrical section, a fourth embodiment of the subject tire.

Shown in FIGS. 8, 9 and 10 are further examples of tires with a self-supporting structure 2 that can be obtained in accordance with the present invention.

Each of these examples differs from the tire described with reference to FIGS. 1 to 7 substantially with reference to the number of components provided in making the carcass structure 2, as well as their mutual arrangement. Manufacture of each component takes place substantially in the same manner as previous described with reference to FIGS. 1 to 7 or in a similar manner.

In particular, the tire shown in FIG. 8 has, in its carcass structure 2, a single carcass ply 3 which is formed of axially inner lengths 13 and axially outer lengths 14, in the absence of the intermediate lengths 15 described with reference to FIGS. 1 to 7. Both the axially inner and axially outer lengths, 13 and 14, are laid down following a circumferential distribution pitch corresponding to a multiple of, more specifically twice, their width, the crown portions 14b of the axially outer lengths 14 being each interposed between the crown portions 13b and two axially inner lengths 13 that are circumferentially adjacent.

In the same manner as in the tire manufacture illustrated in FIGS. 1 to 7, resilient stiffening inserts 16 are applied against the side portions 13a of the axially inner lengths 13 before carrying out deposition of the axially outer lengths 14. Consequently, the resilient stiffening inserts 16 are interposed between the side portions 13a, 14a of the axially inner and axially outer lengths, 13 and 14, once manufacture of the carcass ply 3 has been completed.

Before deposition of the axially inner lengths 13, auxiliary resilient stiffening inserts 20 are also provided to be arranged on the toroidal support 11, for example by directly forming them against the opposite side surfaces of said support or against liner 10 previous formed on said surfaces. Consequently, in the completed carcass structure 2 the auxiliary resilient stiffening inserts 20 are located at an axially inner position relative to the side portions 14a of the axially outer lengths 14.

Each of the annular anchoring structures 4 has a first portion 21, formed of a first annular insert 22 provided with a first filling body 23, which portion is axially interposed against the end portions 13c, 14c of the axially inner and outer lengths, 13 and 14, as well as a second portion 24 comprising a second annular insert 25 applied at an axially outer position against the end portions 14c of the axially outer lengths 14 and provided with a second filling body 26. An auxiliary portion 17 of the anchoring structure 4 comprising an auxiliary annular insert 18 formed of coils 18a, is disposed at an axially inner position against the end portions of the axially inner lengths 13. This auxiliary portion 17 can be directly made or applied against the surfaces of the toroidal support 11 before deposition of the axially inner lengths 13.

In the example shown in FIG. 9, the carcass structure 2 has a first carcass ply 3a and a second carcass ply 3b, formed of axially inner and axially outer lengths 13 and 14, respectively, in the absence of the intermediate lengths 15 described with reference to FIGS. 1 to 7.

In this case, both axially inner and axially outer lengths, 13 and 14, are laid down following a circumferential distribution pitch substantially corresponding to their width. Application of the axially inner lengths 13 is preceded by formation of a pair of auxiliary resilient stiffening inserts 20, located each against one of the opposite sides of the toroidal support 11. In the carcass structure 2 of the finished tire, the auxiliary resilient stiffening inserts 20 are therefore disposed at an axially inner position relative to the side portions 13a of the axially inner lengths 13, in the same manner as described with reference to FIG. 8.

After deposition of the axially inner lengths 13 and before deposition of the axially outer lengths 14, application of the resilient stiffening inserts 16 is carried out and, when the tire has been completed, these inserts will be interposed between the side portions 13a, 14a of the inner and outer lengths 13 and 14, respectively.

Each annular anchoring structure 4 is made in the same manner as described with reference to the embodiment in FIG. 8 but, unlike the latter, the auxiliary annular insert 17 is formed after application of the axially inner lengths 13, at an axially outer position against the end portions 13c of said lengths 13, so as to match the radially inner apex 16a of the respective resilient stiffening insert 16.

It is also provided that the filling body 23 being part of the first portion 21 of each annular anchoring structure 4 should be partly interposed between the first annular insert 22 and the auxiliary insert 18, as clearly shown in FIG. 9.

In the example shown in FIG. 10, the carcass structure 2 has a first and a second carcass plies 3a, 3b. The first carcass ply 3a is formed of axially inner lengths 13 and first axially intermediate lengths 15, laid down following a circumferential pitch which is substantially twice their width and sequentially alternated with each other in the same manner as described with reference to the embodiment of the first carcass ply 3a in the example shown in FIGS. 1 to 7.

Each resilient stiffening insert 16 is axially interposed between the side portions 13a, 15a belonging to the axially inner lengths 13 and the first axially intermediate lengths 15, respectively. The second carcass ply 3b is in turn formed of second axially intermediate lengths 31 laid down on the first carcass ply 3a following a circumferential distribution pitch substantially corresponding to twice their width, and of axially outer lengths 14, each alternated between two axially intermediate second lengths 31. The second intermediate lengths 31 and the outer lengths 14 forming. the second carcass ply 3b can be laid down, in case of need, following a crossed orientation with respect to the first intermediate lengths 15 and the inner lengths 13 forming the first carcass ply 3a. Alternatively or in addition, the lengths belonging to the first and second carcass plies 3a, 3b respectively can be applied following deposition planes offset in parallel on respectively opposite sides relative to a meridian plane of the toroidal support 11, to give a crossed orientation to the side portions of said lengths, while keeping the crown portions oriented according to planes substantially radial to said geometric axis.

Interposed between the side portions 14a, 31a belonging to the outer lengths 14 and the second intermediate lengths 31 respectively, at each of the tire sidewalls 9, is at least one auxiliary resilient support insert 20.

Still with reference to the embodiment in FIG. 10, each of the annular anchoring structures 4 may comprise a first portion 21 axially interposed between the end portions 13c, 15c belonging to the inner lengths 13 and the first intermediate lengths 15 respectively, as well as a second portion 24 located at an axially outer position with respect to the axially outer lengths 14.

An auxiliary portion 17 of the annular anchoring structure 4 is also axially interposed between the end portions 13c of the axially inner lengths 13 and the end portions 15c of the first axially intermediate lengths 15.

It should be noted that by conveniently selecting the deposition modalities of the inner strip-like lengths 13, outer strip-like lengths 14 and intermediate strip-like lengths 15 and 31, carcass structures different from the above described embodiments can be also obtained.

In particular, it is for instance possible to lay down the inner lengths 13 following a circumferential distribution pitch substantially corresponding to their width, to obtain the first carcass ply 3a with a single complete revolution of the toroidal support 11, and make a second carcass ply 3b using outer lengths 14 laid down in alternated sequence with respect to intermediate lengths 15, after interposition of the resilient stiffening inserts 16.

It may be also provided that in the carcass structure 2, the inner lengths 13, intermediate lengths 15 and/or 31 and outer lengths 14 should cooperate in forming a single carcass ply. In this case the lengths belonging to each of the inner 13, intermediate 15 and/or 31 and outer 14 series are laid down following a circumferential distribution pitch which is a multiple of their width. In particular, the numerical factor that, multiplied by the width of each length, gives the value of the circumferential distribution pitch will correspond to the number of length series provided in the formation of the single or of each carcass ply. For instance, if three length series are provided, an inner, intermediate and outer series, 13, 15 and 14 respectively, the circumferential distribution pitch of the lengths of each series will correspond to three times their width.

In more detail, for the purpose of forming the carcass ply it is first provided that the axially inner lengths 13 should be laid down following a circumferential distribution pitch corresponding to a multiple of their width. After application of the resilient stiffening inserts 16 and of the possible auxiliary portions of the annular structures 4, the axially intermediate lengths 15 are applied following a circumferential distribution pitch corresponding to a multiple of their width, each with the respective crown portion 15b disposed circumferentially close to the crown portion 13b of one of the axially inner lengths 13. Then, after application of the auxiliary resilient stiffening inserts 20 and of the first portions 21 of the annular structures 4, application of the axially outer lengths 14 is carried out, said outer lengths too being laid down following a circumferential pitch substantially corresponding to a multiple of their width. When deposition has been carried out, each axially outer length 14 has its crown portion 14b in circumferential side by side relationship between the crown portion 13b of one of the axially inner lengths 13 and the crown portion 15b of one of the axially intermediate lengths 15, so as to define the carcass ply with the above mentioned lengths.

By so doing, in the obtained carcass ply the crown portions 13b, 15b and 14b of the individual lengths are sequentially alternated in mutual side by side relationship along one and the same circumferential line, whereas the respective side portions 13a, 15a, 14a are axially offset with respect to each other to house one or more resilient stiffening inserts 16, 20 in the spaces existing between the side portions of the inner 13 and intermediate 15 lengths, as well as between the side portions of the intermediate 15 and outer 14 lengths.

In conclusion, by suitably selecting the deposition plan of the strip-like lengths, the holding or containment effect exerted by the carcass ply or plies 3a, 3b around the resilient stiffening inserts 16, 20 can be controlled, depending on requirements.

If necessary, in fact, the carcass plies 3a, 3b can be manufactured and disposed so as to form a sort of container completely closed around at least one of the resilient stiffening inserts 16, 20, by making the plies themselves, for example, with the axially inner lengths 13 and axially outer lengths 14 laid down following a pitch corresponding to their width, and causing the end portions 13c, 14c of the lengths to mutually match within the annular anchoring structures 4. Under this circumstance, the elastomer material forming the stiffening insert enclosed between the plies 3a, 3b behaves like a sort of hydrostatic i.e. an incompressible liquid, the deformability of which is strictly correlated with the deformability of the container holding it.

On the contrary, if at least one of the carcass plies 3a, 3b is made with two series of lengths, the inner lengths 13 and outer lengths 14 for example, laid down in an alternated sequence and in subsequent steps after interposition of at least one resilient stiffening insert 16, it is possible to create, in an original manner, a sort of container around the insert itself, which container is partly open on its axially opposite sides. In this case, in fact, it will be possible for the stiffening insert 16 to expand in the free spaces existing, on each of its axially opposite sides, between the side portions of the inner 13 and outer 14 lengths laid down following a pitch which is twice their width. Thus, the modulus of elasticity of the elastomer material used in the stiffening inserts 16 being the same, it is reduced the stiffening degree given to the carcass structure 2 on the whole.

The amount of this reduction in the stiffening degree can be advantageously regulated depending on requirements, by modifying the solid space/void space ratio determined by the side portions of the strip-like lengths on the axially opposite sides of the stiffening insert 16 and/or 20, just as an indication between a maximum value to be obtained, as above said, through accomplishment of two carcass plies 3a, 3b each formed of a single series of strip-like lengths 13, 14 laid down following a pitch corresponding to their width, and a minimum value to be obtained through use, as in the example in FIG. 8, of a single carcass ply 3a formed of two series of lengths 13, 14 laid down in alternated sequence.

The containment degree of the deformations of the resilient stiffening inserts 16, 20 can be also regulated by modifying the construction plan of the annular anchoring structures 4 depending on requirements, in order to modify the axial distance between the end portions 13c, 14c, 15c of the strip-like lengths, so as to offer an additional outlet to the deformations of the stiffening inserts 16, 20 towards the tire bead.

In conclusion, the invention as compared with the known art enables introduction of new variables having an influence on the tire behaviour, particularly in connection with its rigidity both under inflated conditions and under deflated conditions.

In particular it becomes advantageously possible to conveniently regulate the containment degree carried out by the carcass ply or plies 3a, 3b around the resilient stiffening inserts 16, 20, so as to give the desired self-supporting qualities to tire 1 without increasing the torsional rigidity of the same too much, which feature is particularly important for ride-comfort purposes, above all in relation to the effects produced by longitudinal impact forces transmitted to the wheel when the tire encounters obstacles or differences of level on its roadway.

The invention also enables manufacture of a self-supporting tire in which the subject carcass structure can be obtained directly on a toroidal support on which the whole tire can be advantageously formed. In this way all problems connected with the manufacture, storage and management of semifinished products which are common to the manufacturing processes of traditional conception are eliminated.

What is claimed is:

1. A tire for a vehicle wheel, comprising:

a carcass structure having at least one carcass ply provided with end flaps in engagement with respective annular anchoring structures disposed coaxially with a geometric rotation axis of the tire at axially-spaced-apart positions with respect to each other;

a belt structure applied to the carcass structure at a radially-outer position of the carcass structure;

a tread band applied to the belt structure at a radially-outer position of the belt structure;

at least one pair of sidewalls applied to the carcass structure at opposite side positions of the carcass structure; and at least one pair of resilient stiffening inserts incorporated into the carcass structure, each resilient stiffening insert at one of the sidewalls;

wherein the at least on carcass ply comprises:

axially-inner strip lengths, wherein the axially-inner strip lengths are circumferentially distributed around the geometric rotation axis and each extend in a U-shaped configuration around a cross-section outline of the carcass structure to define two side portions spaced apart from each other in an axial direction and a crown portion extending at a radially-outer position between the side portions of the axially-inner strip lengths, axially-outer strip lengths, wherein the axially-outer strip lengths are circumferentially distributed around the geometric rotation axis and each extend in a U-shaped configuration around the cross-section outline of the carcass structure to define two side portions spaced apart from each other in an axial direction and a crown portion extending at a radially-outer position between the side portions of the axially-outer strip lengths, wherein the resilient stiffening inserts are each axially interposed between the side portions of the axially-inner strip lengths and the side portions of the axially-outer strip length, and wherein the carcass structure and resilient stiffening inserts support the vehicle load when the normal inflation pressure of the tire fails.

2. The tire of claim 1, further comprising:

first axially-intermediate strip lengths circumferentially distributed around the geometric rotation axis and each extending in a U-shaped configuration around the cross-section outline of the carcass structure to define two side portions that overlap the resilient stiffening inserts at axially-outer positions and a crown portion extending at a radially-outer position between the side portions of the first axially-intermediate strip lengths; and a pair of auxiliary resilient stiffening inserts each axially interposed between the side portions of the first axially-intermediate strip lengths and the side portions of the axially-outer strip lengths.

3. The tire of claim 2, wherein:

the axially-inner strip lengths are distributed following a circumferential pitch corresponding to a multiple of a width of the axially-inner strip lengths, the first axially-intermediate strip lengths are distributed following a circumferential pitch corresponding to a multiple of a width of the first axially-intermediate strip lengths and each have a respective crown portion interposed in circumferential side-by-side relationship between the crown portions of two axially-inner strip lengths to define a first carcass ply together with the axially-inner strip lengths, and the axially-outer strip lengths are distributed following a circumferential pitch substantially corresponding to a width of the axially-outer strip lengths to define a second carcass ply radially superposed on the first carcass ply close to the crown portions of the axially-inner strip lengths and the first axially-intermediate strip lengths.

4. The tire of claim 2, further comprising second axially-intermediate strip lengths circumferentially distributed around the geometric rotation axis and each extending in a U-shaped configuration around the cross-section outline of the carcass structure to define two side portions partly overlapping the side portions of the first axially-intermediate strip lengths at axially-outer positions and a crown portion extending at a radially-outer position between the side portions of the second axially-intermediate strip lengths.

5. The tire of claim 4, wherein:
the axially-inner strip lengths are distributed following a circumferential pitch substantially corresponding to a multiple of a width of the axially-inner strip lengths,
the first axially-intermediate strip lengths are distributed following a circumferential pitch substantially corresponding to a multiple of a width of the first axially-intermediate strip lengths, each having a respective crown portion interposed in circumferential side-by-side relationship between the crown portions of two axially-inner strip lengths to define a first carcass ply together with the axially-inner strip lengths,
the second axially-intermediate strip lengths are distributed following a circumferential pitch substantially corresponding to a multiple of a width of the second axially-intermediate strip lengths,
the axially-outer strip lengths are distributed following a circumferential pitch substantially corresponding to a width of the axially-outer strip lengths, each having a respective crown portion interposed in circumferential side-by-side relationship between the crown portions of two second axially-intermediate strip lengths to define a second carcass ply together with the second axially-intermediate strip lengths, and
the second carcass ply is radially superposed on the first carcass ply close to the crown portions of the axially-inner strip lengths and the first axially-intermediate strip lengths.

6. The tire of claim 2, wherein:
the axially-inner strip lengths are distributed following a circumferential pitch substantially corresponding to a width of the axially-inner strip lengths to define a first carcass ply,
the first axially-intermediate strip lengths are distributed following a circumferential pitch corresponding to a multiple of a width of the first axially-intermediate strip lengths,
the axially-outer strip lengths are distributed following a circumferential pitch corresponding to a multiple of a width of the axially-outer strip lengths and each have a respective crown portion interposed in circumferential side-by-side relationship between the crown portions of two first axially-intermediate strip lengths to define a second carcass ply together with the first axially-intermediate strip lengths, and
the second carcass ply is radially superposed on the first carcass ply close to the crown portions of the axially-inner strip lengths.

7. The tire of claim 2, wherein the axially-inner strip lengths, the first axially-intermediate strip lengths, and the axially-outer strip lengths are distributed following a circumferential pitch corresponding to a multiple of a width of the axially-inner strip lengths, the first axially-intermediate strip lengths, and the axially-outer strip lengths, respectively, according to a numerical factor corresponding to a series number of the axially-inner strip lengths, the first axially-intermediate strip lengths, and the axially-outer strip lengths provided in forming the at least one carcass ply.

8. The tire of claim 7, wherein the crown portions of individual axially-inner strip lengths, first axially-intermediate strip lengths, and axially-outer strip lengths are sequentially alternated in mutual side-by-side relationship along a same circumferential line, wherein respective side portions are axially offset from each other to house at least one of the resilient stiffening inserts in one or more spaces existing between the side portions of the axially-inner strip lengths and the side portions of the first axially-intermediate strip lengths, as well as between the side portions of the first axially-intermediate strip lengths and the side portion of the axially-outer strip lengths.

9. The tire of claim 2, wherein:
the axially-inner strip lengths are distributed following a circumferential pitch substantially corresponding to a multiple of a width of the axially-inner strip lengths,
the first axially-intermediate strip lengths are distributed following a circumferential pitch substantially corresponding to a multiple of a width of the first axially-intermediate strip lengths and each have a respective crown portion disposed circumferentially close to the crown portion of an axially-inner strip length, and
the axially-outer strip lengths are distributed following a circumferential pitch substantially corresponding to a multiple of a width of the axially-outer strip lengths, each having a respective crown portion in circumferential side-by-side relationship between the crown portion of one of the axially-inner strip lengths and the crown portion of one of the first axially-intermediate strip lengths to define the at least one carcass ply with the axially-inner strip lengths and the first axially-intermediate strip lengths.

10. The tire of claim 2, wherein each of the annular anchoring structures has at least one first portion axially interposed between end portions of the axially-inner strip lengths and end portions of the axially-outer strip lengths, and
wherein each of the annular anchoring structures further comprises at least one second portion disposed at an axially-outer position with respect to the end portions of the first axially-intermediate strip lengths and the end portions of the axially-outer strip lengths.

11. The tire of claim 10, wherein the at least one second portion of the annular anchoring structures comprises:
at least one second circumferentially-inextensible annular anchoring insert disposed at an axially-outer position with respect to the end portions of the axially-outer strip lengths; and
at least one second elastomer filling body extending from the at least one second annular anchoring insert away from the geometric rotation axis.

12. The tire of claim 1, wherein the axially-inner strip lengths are distributed following a circumferential pitch substantially corresponding to a multiple of a width of the axially-inner strip lengths, and
wherein the axially-outer strip lengths each have a respective crown portion interposed in circumferential sideby-side relationship between the crown portions of two axially-inner strip lengths.

13. The tire of claim 1, wherein the axially-inner strip lengths are distributed following a circumferential pitch corresponding to a width of the axially-inner strip lengths to define a first carcass ply, and wherein the axially-outer strip lengths are distributed following a circumferential pitch corresponding to a width of the axially-outer strip lengths to define a second carcass ply radially superposed on the first carcass ply close to the crown portions of the axially-inner strip lengths.

14. The tire of claim 1, further comprising a pair of auxiliary resilient stiffening inserts each disposed at an axially-outer position with respect to the axially-inner strip lengths.

15. The tire of claim 1, wherein each of the strip lengths substantially extend in a plane offset in parallel relative to a meridian plane of the tire so that a respective crown portion, with respect to a radial reference plane passing through a transition point between the crown portion and at least one corresponding side portion, is oriented at a different angle with respect to an inclination of the at least one corresponding side portion.

16. The tire of claim 15, wherein the axially-inner strip lengths and the axially-outer strip lengths lie in disposition plane offset on respectively opposite sides relative to the meridian plane so that at least the side portions of the axially-outer strip lengths.

17. The tire of claim 1, wherein each of the annular anchoring structures has at least one first portion axially interposed between end portions of the axially-inner strip lengths and end portions of the axially-outer strip lengths.

18. The tire of claim 17, wherein the at least one first portion of each of the annular anchoring structures comprises:

at least one first circumferentially-inextensible annular anchoring insert axially interposed between the end portions of the axially-inner strip lengths and the end portions of the axially-outer strip lengths, respectively; and at least one first elastomer filling body extending from the at least one first annular anchoring insert away from the geometric rotation axis and joining a respective resilient stiffening insert.

19. The tire of claim 17, wherein each of the annular anchoring structures further comprising at least one first portion located at an axially-inner position with respect to the end portions of the axially-inner strip lengths.

20. The tire of claim 19, wherein the at least one auxiliary portion of the annular anchoring structures comprises at least one auxiliary circumferentially-inextensible annular anchoring insert disposed against the end portions of the auxiliary-inner strip lengths.

21. The tire of claim 18, 11, or 20, wherein at least one of the annular anchoring inserts comprises at least one thread element disposed in radially-superposed coils.

22. The tire of claim 1, wherein each of the resilient stiffening inserts comprises at least one continuous thread element of elastomer material wound in coils, and wherein the coils are disposed:
in axial side-by-side relationship;
in radial superposition relationship; or
in axial side-by-side and radial superposition relationship around the geometric rotation axis.

23. A method of manufacturing a tire for a vehicle wheel, comprising:

preparing a carcass structure having at least one carcass ply provided with end flaps in engagement with respective annular anchoring structures disposed concentrically with a geometric rotation axis of the tire at axially-spaced-apart positions with respect to each other;

applying a belt structure to the carcass structure at a radially-outer position of the carcass structure;

applying a tread band to the belt structure at a radially-outer position of the belt structure;

applying a pair of sidewalls applied to the carcass structure at opposite side positions of the carcass structure; and incorporating at least one pair of resilient stiffening inserts into the carcass structure concurrently with preparation of the at least one carcass ply;

wherein preparing the carcass structure comprises:

preparing strip lengths each comprising longitudinal and parallel thread elements;

laying down axially-inner strip lengths circumferentially distributed on a toroidal support, each of the axially-inner strip lengths extending in a U-shaped configuration around a cross-section outline of the toroidal support to define two side portions spaced apart from each other in an axial direction and a crown portion extending at a radially-outer position between the side portions of the axially-inner strip lengths;

applying the resilient stiffening inserts at an axially-outer position relative to the side portions of the axially-inner strip lengths; and laying down axially-inner strip lengths circumferentially distributed on the toroidal support, each of the axially-outer strip lengths extending in a U-shaped configuration around the cross-section outline of the toroidal support to define two side portions spaced apart from each other in an axial direction, each extending at a axially-outer position relative to one of the resilient stiffening inserts, and a crown portion extending at a radially-outer position between the side portions of the axially-outer strip lengths;

wherein the carcass structure and resilient stiffening inserts can support the vehicle load when the normal inflation pressure of the tire fails.

24. The method of claim 23, wherein before laying down the axially-outer strip lengths, the following is carried out:

laying down first axially-intermediate strip lengths circumferentially distributed around the geometric rotation axis and each extending in a U-shaped configuration around the cross-section outline of the toroidal support to define two side portions overlapping the resilient stiffening inserts at axially-outer positions and a crown portion extending at a radially-outer position between the side portions of the first axially-intermediate strip lengths; and applying a pair of auxiliary resilient stiffening inserts at an axially-outer position relative to the side portions of the first axially-intermediate strip lengths.

25. The method of claim 24, wherein:

the axially-inner strip lengths are laid down following a circumferential distribution pitch substantially corresponding to a multiple of a width of the axially-inner strip lengths, the first axially-intermediate strip lengths are laid down following a circumferential distribution pitch substantially corresponding to a multiple of a width of the first axially-intermediate strip lengths, each having a respective crown portion interposed in circumferential side-by-side relationship between the crown portions of two axially-inner strip lengths to define a first carcass ply together with the axially-inner strip lengths, and the axially-outer strip lengths are laid down following a circumferential distribution pitch substantially corresponding to a width of the axially-outer strip lengths to define a second carcass ply radially superposed on the first carcass ply.

26. The method of claim 24, wherein before applying the auxiliary resilient stiffening inserts, the following is carried out:

laying down first axially-intermediate strip lengths circumferentially distributed around the geometric rotation axis and each extending in a U-shaped configuration around the cross-section outline of the toroidal support to define two side portions partly overlapping the side portions of the first axially-intermediate strip lengths laid down beforehand at axially-outer positions and a crown portion extending at a radially-outer position between the side portions of the second axially-intermediate strip lengths.

27. The method of claim 26, wherein:

the axially-inner strip lengths are laid down following a circumferential distribution pitch substantially corresponding to a multiple of a width of the axially-inner strip lengths, the first axially-intermediate strip lengths are laid down following a circumferential distribution pitch substantially corresponding to a multiple of a width of the first axially-intermediate strip lengths, each having a respective crown portion interposed in circumferential side-by-side relationship between the crown portions of two axially-inner strip lengths to define a first carcass ply together with the axially-inner strip lengths, the second axially-intermediate strip lengths are laid down following a circumferential distribution pitch substantially corresponding to a multiple of a width of the second axially-intermediate strip lengths, and the axially-outer strip lengths are laid down following a circumferential distribution pitch substantially corresponding to a multiple of a width of the axially-outer strip lengths, each having a respective crown portion interposed in circumferential side-by-side relationship between the crown portions of two of the second axially-intermediate strip lengths to define a second carcass ply together with the second axially-intermediate strip lengths.

28. The method of claim 24, wherein:

the axially-inner strip lengths are laid down following a circumferential distribution pitch substantially corresponding to a width of the axially-inner strip lengths to define a first carcass ply, the first axially-intermediate strip lengths are laid down following a circumferential distribution pitch substantially corresponding to a multiple of a width of the first axially-intermediate strip lengths, and the axially-outer strip lengths are laid down following a circumferential distribution pitch substantially corresponding to a multiple of a width of the axially-outer strip lengths, each having a respective crown portion interposed in circumferential side-by-side relationship between the crown portions of two of the first axially-intermediate strip lengths to define a second carcass ply together with the first axially-intermediate strip lengths, the second carcass ply being radially superposed on the first carcass ply close to the crown portions of the axially-inner strip lengths.

29. The method of claim 24, wherein:

the axially-inner strip lengths are distributed following a circumferential pitch substantially corresponding to a multiple of a width of the axially-inner strip lengths, the first axially-intermediate strip lengths are laid down following a circumferential distribution pitch substantially corresponding to a multiple of a width of the first axially-intermediate strip lengths, each having a respective crown portion disposed circumferentially in side-by-side relationship with the crown portion of an axially-inner strip length, and the axially-outer strip lengths are laid down following a circumferential pitch substantially corresponding to a multiple of a width of the axially-outer strip lengths, each having a respective crown portion in circumferential side-by-side relationship between the crown portion of one of the axially-inner strip lengths and the crown portion of one of the first axially-intermediate strip lengths to define the at least one carcass ply with the axially-inner strip lengths and the first axially-intermediate strip lengths.

30. The method of claim 23, wherein the axially-inner strip lengths are distributed following a circumferential pitch substantially corresponding to a multiple of a width of the axially-inner strip lengths, and wherein the axially-outer strip lengths are each laid down so that a respective crown portion is in circumferential side-by-side relationship between two crown portions of the axially-inner strip lengths.

31. The method of claim 23, wherein the axially-inner strip lengths are distributed following a circumferential pitch substantially corresponding to a width of the axially-inner strip lengths to define a first carcass ply, and wherein the axially-outer strip lengths are distributed following a circumferential pitch substantially corresponding to a width of the axially-outer strip lengths to define a second carcass ply radially superposed on the first carcass ply close to the crown portions of the axially-inner strip lengths.

32. The method of claim 23, further comprising arranging a pair of auxiliary resilient stiffening inserts each disposed at an axially-inner position with respect to the axially-inner strip lengths.

33. The method of claim 23, wherein each of the strip lengths is laid down in a plane offset in parallel to a meridian plane of the toroidal support.

34. The method of claim 33, wherein the axially-inner strip lengths and the axially-outer strip lengths are laid down following respective deposition planes that are offset on opposite sides relative to the meridian plane so that the side portions of the axially-inner strip lengths and the side portions of the axially-outer strip lengths have respectively inclined orientations.

35. The method of claim 23, wherein accomplishment of each of the annular anchoring structures comprises forming at least one first portion of the annular anchoring structure at an axially-outer position relative to end portions of the axially-inner strip lengths previously laid down on the toroidal support before deposition of the axially-outer strip lengths.

36. The method of claim 35, wherein formation of the at least one first portion of each of the annular anchoring structures comprises:

applying at least one first circumferentially-inextensible annular insert at an axially-outer position relative to the end portions of the axially-inner strip lengths laid down on the toroidal support, and applying at least one first elastomer filling body extending from the at least one first annular anchoring insert away from the geometric rotation axis and joining a respective resilient stiffening insert.

37. The method of claim 35, wherein accomplishment of the annular anchoring structures further comprises forming at least one second portion of annular anchoring structure against end portions of the axially-outer strip lengths.

38. The method of claim 37, wherein formation of the at least one second portion of each of the annular anchoring structures comprises:

applying at least one second circumferentially-inextensible annular anchoring insert at an axially-outer position relative to the end portions of the axially-outer strip lengths, and applying at least one second elastomer filling body extending from the at least one second annular anchoring insert away from the geometric rotation axis.

39. The method of claim 35, wherein accomplishment of each of the annular anchoring structures further comprises forming at least one auxiliary portion on the toroidal support before deposition of the axially-inner strip lengths.

40. The method of claim 36 or 38, wherein at least one of the annular anchoring inserts is formed through winding of at least one continuous threaded element in radially-superposed coils.

41. The method of claim 36 or 38, wherein at least one of the elastomer filling bodies is formed through winding of at least one continuous thread element of elastomer material in coils disposed in axial side-by-side relationship, in radial superposition relationship, or in axial side-by-side and radial superposition relationship around a geometric axis of toroidal support.

42. The method of claim 23, wherein each of the resilient stiffening insert is formed through winding of at least one continuous thread element of elastomer material in coils disposed in axial side-by-side relationship, in radial superposition relationship, or in axial side-by-side and radial superposition relationship around a geometric axis of the toroidal support.

* * * * *

UNITED STATES PATENT AND TRADEMARK OFFICE
CERTIFICATE OF CORRECTION

PATENT NO. : 6,814,119 B2
DATED : November 9, 2004
INVENTOR(S) : Renato Caretta et al.

It is certified that error appears in the above-identified patent and that said Letters Patent is hereby corrected as shown below:

Column 18,
Line 19, "on" should read -- one --.
Line 39, "length," should read -- lengths, --.

Column 21,
Line 19, "extend" should read -- extends --.
Line 28, "plane" should read -- planes --.
Lines 29-30, "the axially-outer" should read -- the axially-inner strip lenghts have a crossed orientation with respect to the side portions of the axially-outer --.
Line 49, "comprising at least one first" should read -- comprises at least one auxiliary --.

Column 22,
Line 3, "having" should read -- comprising --.
Line 4, "provided with" should read -- having --.

Column 23,
Line 15, "first" should read -- second --.

Column 25,
Line 11, "of annular" should read -- of the annular --.

Column 26,
Lines 13-14, "of toroidal" should read -- of the toroidal --.

Signed and Sealed this

Tenth Day of May, 2005

JON W. DUDAS
*Director of the United States Patent and Trademark Office*